United States Patent
Fukuoka et al.

(10) Patent No.: US 9,144,785 B2
(45) Date of Patent: Sep. 29, 2015

(54) CATALYST FOR HYDROLYZING CELLULOSE OR HEMICELLULOSE AND METHOD FOR PRODUCING SUGAR-CONTAINING SOLUTION EMPLOYING SAME

(75) Inventors: Atsushi Fukuoka, Sapporo (JP); Hirokazu Kobayashi, Sapporo (JP); Tasuku Komanoya, Sapporo (JP); Tadashi Yoneda, Minato-ku (JP); Ichiro Fujita, Minato-ku (JP)

(73) Assignees: NATIONAL UNIVERSITY CORPORATION HOKKAIDO UNIVERSITY, Hokkaido (JP); SHOWA DENKO K.K., Tokyo (JP)

( * ) Notice: Subject to any disclaimer, the term of this patent is extended or adjusted under 35 U.S.C. 154(b) by 845 days.

(21) Appl. No.: 13/498,285
(22) PCT Filed: Aug. 5, 2010
(86) PCT No.: PCT/JP2010/063284
  § 371 (c)(1),
  (2), (4) Date: Jun. 11, 2012
(87) PCT Pub. No.: WO2011/036955
  PCT Pub. Date: Mar. 31, 2011

(65) Prior Publication Data
  US 2012/0240921 A1  Sep. 27, 2012

(30) Foreign Application Priority Data
  Sep. 25, 2009  (JP) ................................. 2009-220087

(51) Int. Cl.
  *B01J 31/02*  (2006.01)
  *C13K 1/02*  (2006.01)
  (Continued)

(52) U.S. Cl.
  CPC *B01J 21/18* (2013.01); *B01J 23/40* (2013.01); *B01J 23/462* (2013.01); *B01J 35/002* (2013.01);
  (Continued)

(58) Field of Classification Search
  None
  See application file for complete search history.

(56) References Cited

U.S. PATENT DOCUMENTS

2004/0047798 A1  3/2004  Oh et al.
2009/0217922 A1  9/2009  Fukuoka et al.

FOREIGN PATENT DOCUMENTS

CN  101394928 A  3/2009
CN  101525355 A  9/2009
(Continued)

OTHER PUBLICATIONS

Communication dated Aug. 19, 2014 from the Taiwanese Patent Office in counterpart application No. 099126284.
(Continued)

*Primary Examiner* — Melvin C Mayes
*Assistant Examiner* — Stefanie Cohen
(74) *Attorney, Agent, or Firm* — Sughrue Mion, PLLC

(57) ABSTRACT

Disclosed are: a novel catalyst for the hydrolysis of cellulose, which does not require the use of a large quantity of sulfuric acid for the preparation thereof and from which sulfuric acid cannot be eluted; a novel catalyst for the hydrolysis of cellulose, which is not changed in structure even in hot water and therefore does not undergo the deterioration in activity; and a process for producing a cellulose hydrolysate, mainly including glucose, using any one of the aforementioned catalysts. Specifically disclosed are: a catalyst for the hydrolysis of cellulose, which comprises a porous carbon material having a specific surface area of 800 to 2500 m2/g inclusive and a phenolic hydroxy group content of 100 to 700 mmol/kg inclusive, such as a porous carbon material having such a structure that carbon is filled in pores of mesoporous silica that is used as a template; and a catalyst for the hydrolysis of cellulose or hemicellulose, which comprises the aforementioned porous carbon material and a transition metal belonging to Group 8 to Group 11 and supported on the porous carbon material.

23 Claims, 5 Drawing Sheets

(51) Int. Cl.
*B01J 21/18* (2006.01)
*B01J 23/40* (2006.01)
*B01J 23/46* (2006.01)
*B01J 35/00* (2006.01)
*B01J 35/02* (2006.01)
*B01J 35/10* (2006.01)
*B01J 37/00* (2006.01)
*B01J 37/08* (2006.01)
*B01J 21/06* (2006.01)
*B01J 29/03* (2006.01)
*B01J 29/04* (2006.01)

(52) U.S. Cl.
CPC ............ *B01J 35/023* (2013.01); *B01J 35/1023* (2013.01); *B01J 35/1028* (2013.01); *B01J 35/1047* (2013.01); *B01J 35/1061* (2013.01); *B01J 37/0018* (2013.01); *B01J 37/084* (2013.01); *C13K 1/02* (2013.01); *A23V 2002/00* (2013.01); *B01J 21/063* (2013.01); *B01J 21/066* (2013.01); *B01J 29/0325* (2013.01); *B01J 29/043* (2013.01)

(56) References Cited

FOREIGN PATENT DOCUMENTS

| EP | 2 374 903 A1 | 10/2011 |
| JP | 2006-129735 A | 5/2006 |
| JP | 2009-201405 A | 9/2009 |
| JP | 2009-296919 A | 12/2009 |
| WO | 2007/100052 A1 | 9/2007 |
| WO | 2010/067593 A1 | 6/2010 |

OTHER PUBLICATIONS

"Synthesis of new, nanoporous carbon with hexagonally ordered mesostructure", Shinae Jun et al., J.Am.Chem.Soc., 2000, 122, 10712-10713.

Communication dated Jan. 5, 2015 from the State Intellectual Property Office of People's Republic of China in counterpart Application No. 201080043202.4.

Kitano, Masaaki, et al., "Adsorption-Enhanced Hydrolysis of B-1, 4-Glucan on Graphene-Based Amorphous Carbon Bearing $SO_3H$, COOH, and OH Groups," Langmuir, May 5, 2009, pp. 5068-5075, vol. 25, Iss. 9.

Komonoya, Tasuku, et al., "Cellulose hydrolysis with carbon-supported metal catalysts," Shokubai Toronkai Toronkai A Yokoshu, Mar. 24, 2010, pp. 59, vol. 105.

Extended European Search Report dated Jun. 12, 2014, issued by the European Patent Office in corresponding European Application No. 10818631.3.

Chen Luo et al., "Cellulose Conversion into Polyols Catalyzed by Reversibly Formed Acids and Supported Ruthenium Clusters in Hot Water", Angewandte Chemie International Edition, vol. 46, No. 40, Oct. 8, 2007, pp. 7636 to 7639, XP055003509.

Hirokazu Kobayashi et al., "Water-Tolerant Mesoporous-Carbon-Supported Ruthenium Catalysts for the Hydrolysis of Cellulose to Glucose", Chemsuschem, Wiley-VCH Verlag Gmbh & Co., KGAA, DE, IT, vol. 3, No. 4, Apr. 26, 2010, pp. 440 to 443, XP002673445.

Sasaki et al., Dissolution and Hydrolysis of Cellulose in Subcritical and Supercritical Water, Ind. Eng. Chem. Res., 2000, vol. 39, pp. 2883-2990.

Suganuma et al., Hydrolysis of Cellulose by Amorphous Carbon Bearing $SO_3H$, COOH, and OH Groups, J. Am. Chem. Soc., 2008, vol. 130, pp. 12787-12793.

Onda et al., "Selective hydrolysis of cellulose into glucose over solid acid catalyst", Green Chem.,2008, vol. 10, pp. 1033-1037.

Ryoo et al., "Synthesis of Highly Ordered Carbon Molecular Sieves via Template-Mediated Structural Transformation", J. Phys. Chem. B, 1999, vol. 104, No. 37, pp. 7743-7746.

Notification Concerning Transmittal of International Preliminary Report on Patentability, dated Apr. 5, 2012.

Notification of Transmittal of Translation of the International Preliminary Report on Patentability, dated Apr. 19, 2012.

Support

- Vacuum drying (150°C, 1 hours)
← Water
← Metal salt aqueous solution
- Stirring (15 hours)
- Removal of water by distillation
- Reduction (hydrogen, 400°C, 2 hours)

Catalyst

CATALYST FOR HYDROLYZING CELLULOSE OR HEMICELLULOSE AND METHOD FOR PRODUCING SUGAR-CONTAINING SOLUTION EMPLOYING SAME

CROSS-REFERENCE TO RELATED PATENT APPLICATIONS

The present application claims priority under Japanese Patent Application 2009-220087, filed on Sep. 25, 2009, the entire contents of which are hereby incorporated by reference herein.

TECHNICAL FIELD

The present invention relates to a catalyst for hydrolyzing cellulose or hemicellulose employing a porous carbon material or a supported metal porous carbon material, and to a method for manufacturing a sugar-containing solution employing this catalyst.

BACKGROUND ART

The sulfuric acid method and enzymatic methods are examples of conventional cellulose hydrolysis methods. However, the sulfuric acid method presents problems such as corrosion of the reactor and processing to neutralize reaction waste products. Enzymatic methods present problems in that the enzymes are expensive and of low activity, and in that the enzymes must be separated from the reaction product. There is also the method of hydrolyzing cellulose in subcritical or supercritical water at 300° C. and above. For example, a report by Arai et al. of Tohoku University (Nonpatent Reference 1) states that a large variety of products are produced and glucose selectivity is not high.

The pressurized hot water method employing a solid catalyst is an example of a substitute method for the above. The pressurized hot water method affords an advantage in that neutralization processing and separation processing are not required. However, it requires the development of catalysts with activity that can withstand the conditions of pressurized hot water.

In recent years, Hara et al. of the Tokyo Institute of Technology (Nonpatent Reference 2) and Onda et al. of Kochi University (Nonpatent Reference 3) have reported cellulose hydrolysis reactions employing solid acid catalysts comprised of carbon on which sulfuric acid was immobilized. These reports claimed that oligosaccharides or glucose was obtained as the main reaction product. It also stated that glucose, in particular, was an important compound because it could be converted to bioplastics and biofuels.

Patent Reference 1 discloses a liquefying method of cellulose-based biomass comprising the steps of reacting a cellulose-based biomass starting material with functional groups on a carrier surface and conducting hydrothermal decomposition. The examples of inorganic solids such as activated carbon are given for the carrier. Patent Reference 2 discloses a method of hydrolyzing cellulose comprising the step of heating a reaction solution comprised of a solid catalyst having an acidic or a basic functional group within the molecule, dispersion water, and a cellulose starting material. Activated carbon is given as an example of the solid catalyst.

Patent Reference 1: Japanese Unexamined Patent Publication (KOKAI) 2009-296919
Patent Reference 2: Japanese Unexamined Patent Publication (KOKAI) No. 2006-129735
Patent Reference 3: WO2010/067593
Nonpatent Reference 1: Ind. Eng. Chem. Res., 39, 2883-2990 (2000)
Nonpatent Reference 2: J. Am. Chem. Soc., 130, 12787-12793 (2008)
Nonpatent Reference 3: Green Chem., 10, 1033-1037 (2008)
Nonpatent Reference 4: J. Phys. Chem. B, 103, 7743-7746 (1999)

The entire contents of Patent References 1 to 3 and Nonpatent References 1 to 4 are hereby incorporated by reference herein.

SUMMARY OF INVENTION

However, the catalysts described in Nonpatent References 2 and 3 present the possibility of leaching of immobilized sulfuric acid. Further, since a large quantity of sulfuric acid is employed to prepare the catalysts, the drawbacks of the sulfuric acid method are not entirely eliminated and there is still room for improvement.

Further, Patent Reference 1 discloses no embodiments based on activated carbon. There is no disclosure whatsoever of what type of activated carbon to employ. Patent Reference 2 discloses an embodiment employing common commercially available activated carbon, but only the ratio of unreacted cellulose is indicated. There is no disclosure of the glucose yield, glucose selectivity, the by-products that are produced, or the like.

A variety of types of activated carbon and porous carbon materials are generally known to exist depending on the objective and application. However, no suggestion has been made of what type of porous carbon material is suited to the hydrolysis of cellulose to obtain glucose at a high yield and with high selectivity.

Accordingly, one object of the present invention is to provide a new catalyst for hydrolyzing cellulose or hemicellulose that does not require the use of a large quantity of sulfuric acid in catalyst preparation and that does not present the possibility of leaching of sulfuric acid from the catalyst.

Further, a part of the present inventors have previously invented a cellulose hydrolysis reaction that does not required an acid and is conducted under rapid heating and air-cooled conditions employing a supported metal catalyst, but that does not require an acid (Patent Reference 3). Compared to a catalyst on which sulfuric acid has been immobilized, a supported metal catalyst affords advantages such as: (i) not requiring an acid, (ii) no leaching out of the supported metal, and (iii) the ability to control the activity of the catalyst by varying the combination of supported metal and carrier.

However, subsequent research has revealed that the catalyst employed in the invention undergoes structural change in hot water, resulting in decreased activity.

Accordingly, the second object of the present invention is to provide a new catalyst for hydrolyzing cellulose or hemicellulose that does not undergo a structural change in hot water resulting in decreased activity, and a method for producing hydrolyzates of cellulose or hemicellulose such as glucose by using this catalyst.

Means of Solving the Problems

The present inventors conducted extensive research. As a result, they discovered that a supported metal catalyst employing a carrier in the form of a porous carbon material having a relatively large specific surface area and surface functional groups in the form of a relatively large number of phenolic hydroxyl groups, such as a porous carbon material prepared using mesoporous silica as a template, exhibited excellent cellulose and hemicellulose hydrolytic activity, and that it could be repeatedly employed in reactions without the detection of catalyst structural change or deterioration, even in hydrolysis in hot water. The first aspect of the present invention, which achieves the second object of the present invention, was devised on that basis.

The present inventors further discovered that a porous carbon material, comprising a relatively large, prescribed quantity of phenolic hydroxyl groups as surface functional groups and having a large specific surface area, such as a porous carbon material prepared employing mesoporous silica as a template, exhibited excellent cellulose and hemicellulose hydrolytic activity. The second aspect of the invention, which achieves the first object of the present invention, was devised on that basis.

The present invention is as set forth below:

[1]

A catalyst for hydrolyzing cellulose or hemicellulose, in which a Group 8 to 11 transition metal is supported on a porous carbon material comprising a quantity of phenolic hydroxyl groups of 100 mmol/kg or greater and 700 mmol/kg or lower and having a specific surface area of 800 $m^2/g$ or higher and 2,500 $m^2/g$ or lower.

[2]

The catalyst according to [1], wherein the porous carbon material is a porous carbon material having a form in which mesoporous silica is served as a template and fine pores of the mesoporous silica are filled with carbon.

[3]

The catalyst according to [1] or [2], wherein in the porous carbon material, when a straight line drawn from the minimum absorbance value between 1,550 $cm^{-1}$ and 1,700 $cm^{-1}$ to the absorbance at 1,000 $cm^{-1}$ in the FT-IR transmission spectrum of carbon is employed as a baseline, the ratio of the absorbance at 1,240 $cm^{-1}$ due to phenolic hydroxyl groups to the absorbance at 1,530 $cm^{-1}$ due to aromatic rings ($A_{PhOH}/A_C$) is 0.2 or greater.

[4]

The catalyst according to any one of [1] to [3], wherein the average secondary particle diameter (d50 (based on volume)) of the porous carbon material is 1 μm or greater and 30 μm or lower.

[5]

The catalyst according to any one of [1] to [4], wherein the transition metal is at least one member selected from the group consisting of ruthenium, platinum, rhodium, palladium, iridium, nickel, cobalt, iron, copper, silver, and gold.

[6]

The catalyst according to any one of [1] to [4], wherein the transition metal is at least one member selected from the group consisting of ruthenium, platinum, palladium, and rhodium.

[7]

A catalyst for hydrolyzing cellulose or hemicellulose, comprised of a porous carbon material comprising a quantity of phenolic hydroxyl groups of 100 mmol/kg or greater and 700 mmol/kg or lower and having a specific surface area of 800 $m^2/g$ or higher and 2,500 $m^2/g$ or lower.

[8]

The catalyst according to [7], wherein the porous carbon material has a form in which mesoporous silica is served as a template and fine pores of the mesoporous silica are filled with carbon.

[9]

The catalyst according to [7] or [8], wherein in the porous carbon material the ratio (PhOH/C) of the absorption intensity, based on phenolic hydroxyl groups at 1,240 $cm^{-1}$ adopting a straight line connecting the values of the K-M function at 1,190 $cm^{-1}$ and 1,270 $cm^{-1}$ as baseline, to the absorption intensity, based on aromatic rings at 1,615 $cm^{-1}$ adopting a straight line connecting the K-M function values at 1,540 $cm^{-1}$ and 1,750 $cm^{-1}$ as baseline in the diffuse reflectance FT-IR spectrum after the Kubelka-Munk (K-M) function transformation of carbon, is 0.2 or greater.

[10]

The catalyst according to any one of [7] to [9], wherein the average secondary particle diameter (d50 (based on volume)) of the porous carbon material is 1 μm or greater and 30 μm or lower.

[11]

The catalyst according to any one of [1] to [10], wherein cellulose is heated in the presence of water to produce oligosaccharides and glucose.

[12]

The catalyst according to any one of [1] to [10], wherein hemicellulose is heated in the presence of water to produce sugar.

[13]

A method for producing a sugar-containing solution comprised mainly of glucose, comprising hydrolyzing cellulose in the presence of water and at least any one of the catalysts according to [1] to [10] to produce at least oligosaccharides and glucose.

[14]

The production method according to [13], wherein the hydrolysis of cellulose is conducted at a temperature producing a pressurized state.

[15]

The production method according to [14], wherein the heating temperature falls within a range of 110 to 380° C.

[16]

The production method according to [14] or [15], wherein the heating is ended at a point in time when the conversion of cellulose by hydrolysis is between 10 and 100% and the glucose selectivity is between 20 and 80%).

[17]

The production method according to [14] or [15], wherein the heating is ended at a point in time when the conversion of cellulose by hydrolysis is between 10 and 100%, the glucose selectivity is between 20 and 80%, and the 5-hydroxymethylfurfural selectivity is 8%) or less.

[18]

The production method according to any one of [14] to [17], wherein the reaction solution is cooled after ending the heating.

[19]

The production method according to [18], wherein the cooling of the reaction solution is conducted under conditions that maintain a glucose selectivity of between 20 and 80%).

[20]

The production method according to [18] or [19], wherein the cooling of the reaction solution is conducted at a rate of from 1 to 200° C./minute to a temperature of 110° C.

[21]

The production method according to any one of [13] to [20], wherein the cellulose has crystallinity, or is cellulose of reduced crystallinity.

[22]

The production method according to any one of [13] to [21], wherein following hydrolysis, the reaction mixture is subjected to solid-liquid separation to separate a sugar-containing solution comprised mainly of glucose and a solid containing at least the catalyst and unreacted cellulose.

[23]
A method for producing a sugar-containing solution comprised mainly of sugars, comprising hydrolyzing hemicellulose in the presence of at least the catalyst according to any one of [1] to [10] and water to produce at least an oligosaccharide or monosaccharide.

Effect of the Invention

The present invention provides a new catalyst for hydrolyzing cellulose or hemicellulose, in which a drop in activity due to repeated use is inhibited. The present invention further provides a new catalyst for hydrolyzing cellulose or hemicellulose that does not require a large quantity of sulfuric acid in catalyst preparation and which does not present the possibility of sulfuric acid leaching out of the catalyst. Additionally, these catalysts can be used to hydrolyze cellulose and obtain a sugar-containing solution comprised mainly of glucose, and to hydrolyze hemicellulose and obtain a sugar-containing solution comprised mainly of sugars.

The Catalyst for Hydrolysis

Figure 1:
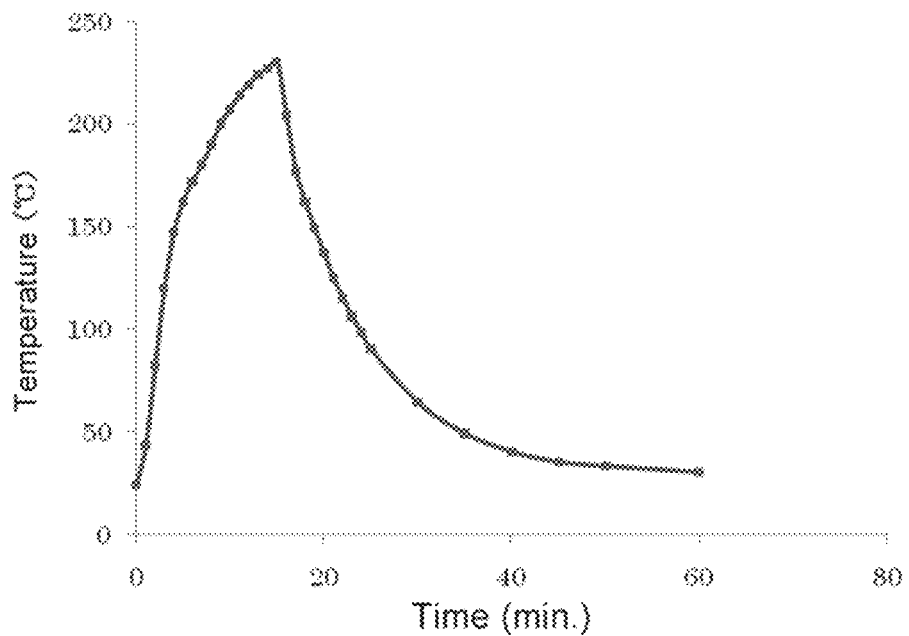
FIG. 1 Shows the change over time in the temperature within the reactor in the embodiments.

The first aspect of the present invention relates to a catalyst for hydrolyzing cellulose or hemicellulose in which a transition metal of Group 8 to 11 is supported on a porous carbon material. The porous carbon material in the catalyst comprises a quantity of phenolic hydroxyl groups of 100 mmol/kg or greater and 700 mmol/kg or lower, and has a specific surface area of 800 $m^2$/g or greater and 2,500 $m^2$/g or lower. In the present specification, specific surface area means BET specific surface area. Examples of porous carbon materials comprising a quantity of phenolic hydroxyl groups of 100 mmol/kg or greater and 700 mmol/kg or lower and having a specific surface area of 800 $m^2$/g or higher and 2,500 $m^2$/g or lower are porous carbon materials having the form of mesoporous silica fine pores filled with carbon that are prepared by employing mesoporous silica as a template, filling the fine pores of the mesoporous silica with carbon, and then removing the mesoporous silica template. The porous carbon material can also be a porous carbon material having surface functional groups in the form of phenolic hydroxyl groups, having infrared absorption assigned to C—O stretching vibration and phenolic hydroxyl group bending vibration at 1,200 $cm^{-1}$±50 $cm^{-1}$ in the FT-IR transmission spectrum, and having a specific surface area of 800 $m^2$/g or higher and 2,500 $m^2$/g or lower. More specifically, in the porous carbon material having infrared absorption, when a straight line drawn from the minimum absorbance value between 1,550 $cm^{-1}$ and 1,700 $cm^{-1}$ in the FT-IR transmission spectrum of carbon to the absorbance at 1,000 $cm^{-1}$ is employed as a baseline, the ratio of the absorbance at 1,240 $cm^{-1}$ due to phenolic hydroxyl groups to the absorbance at 1,530 $cm^{-1}$ due to aromatic rings ($A_{PhOH}/A_C$) is 0.2 or greater. Preferably, the porous carbon material is in the form of mesoporous silica fine pores filled with carbon with an absorbance ratio ($A_{PhOH}/A_C$) of 0.2 or greater.

The second aspect of the present invention relates to a catalyst for hydrolyzing cellulose or hemicellulose, comprised of a porous carbon material having a quantity of phenolic hydroxyl groups of 100 mmol/kg or greater and 700 mmol/kg or lower and having a specific surface area of 800 $m^2$/g or higher and 2,500 $m^2$/g or lower. The second aspect of the present invention is a catalyst for hydrolyzing cellulose or hemicellulose comprising just the porous carbon material without supporting a transition metal. The porous carbon material in the present catalyst, for example, can have the form of mesoporous silica fine pores filled with carbon, with the mesoporous silica as a template. In the porous carbon material, in the diffuse reflectance FT-IR spectrum after the Kubelka-Munk (K-M) function transformation of carbon, the ratio (PhOH/C) of the absorption intensity based on phenolic hydroxyl groups at 1,240 $cm^{-1}$ using a straight line connecting the values of the K-M function at 1,190 $cm^{-1}$ and 1,270 $cm^{-1}$ as a baseline to the absorption intensity based on aromatic rings at 1,615 $cm^{-1}$ using a straight line connecting the values of the K-M function at 1,540 $cm^{-1}$ and 1,750 $cm^{-1}$ as a baseline is 0.2 or greater. Preferably, the porous carbon material has the form of mesoporous silica fine pores filled with carbon, in which the absorption intensity (PhOH/C) is 0.2 or greater.

The present inventors explored catalyst carriers that were capable of promoting the hydrolysis of cellulose or hemicellulose and that were stable in hot water under the hydrolysis conditions of cellulose or hemicellulose. As a result, they found out catalysts in which a metal was supported in a porous carbon material (the first aspect).

The present inventors conducted extensive research with the goal of providing a new catalyst for hydrolyzing cellulose or hemicellulose that did not require the use of a large quantity of sulfuric acid in catalyst preparation and that did not present the possibility of the elution of sulfuric acid from the catalyst. As a result, they found out that the above porous carbon material functioned as a catalyst for hydrolyzing cellulose or hemicellulose even when not supporting a metal (the second aspect).

One example of the porous carbon material is a porous carbon material that is prepared by employing mesoporous silica as a template, filling the fine pores of the mesoporous silica with carbon, and then removing the mesoporous silica template. The mesoporous silica that is employed as the template desirably has a specific surface area of 300 $m^2$/g or greater from the perspective of obtaining a porous carbon material.

CMK is an example of such a porous carbon material (Nonpatent Reference 4). CMK is a regular mesoporous carbon, synthesized by replicating the structure of regular mesoporous silica, which is imparted with a high degree of oxygen-containing functional groups (one oxygen atom per 12 to 16 carbon atoms). The structure of CMK can be controlled by varying the structure of the silica employed as a template. CMK-1 can be synthesized using MCM-48 as a template, and CMK-3 can be synthesized using SBA-15 as a template, with various spatial structures.

The fine pores of mesoporous silica can be filled with carbon by, for example, employing a sugar compound to fill the fine pores of mesoporous silica and heating the assembly to carbonize the sugar compound. The silica template can be removed by stirring in hydrofluoric acid or a basic aqueous solution. Reference can be made to the method described in Nonpatent Reference 4 for this method. The porous carbon material thus obtained is sometimes referred to as mesoporous carbon. Examples thereof are summarized in Table 1 below.

TABLE 1

Typical examples of mesoporous carbon

| Name | Reference | Description |
|---|---|---|
| CMK-1 | J. Phys. Chem. B, 1999, 103, 7743. | Synthesized using MCM-48 as a template. Fine pores 3 nm, specific surface area 1,400 m$^2$g$^{-1}$, composition following 800° C. heat treatment: $C_{12}H_1O_1$. |
| CMK-2 | Adv. Mater., 2001, 13, 677. | Synthesized using SBA-1 as a template. |
| CMK-3 | J. Am. Chem. Soc., 2000, 122, 10712. | Synthesized using SBA-15 as a template. Fine pore diameter 3.8 nm, specific surface area 1,120 m$^2$g$^{-1}$. |
| CMK-4 | J. Phys. Chem. B, 2002, 106, 1256. | Synthesized using MCM-48 as a template. |
| CMK-5 | Nature, 2001, 412, 169; Angew. Chem. Int. Ed., 2003, 42, 2182. | Synthesized using SBA-15 as a template. The rod has a hollow structure. Fine pore diameter 3-5 nm, specific surface area 2,000 m$^2$g$^{-1}$. |
| CMK-8 | Chem. Commun. 2003, 2136. | Synthesized using KIT-6 as a template. Fine pore diameter 3 nm, specific surface area 1,000 m$^2$g$^{-1}$. |
| CMK-9 | Chem. Commun. 2003, 2136. | Synthesized using KIT-6 as a template. The rod has a hollow structure. Fine pore diameter 3 nm (between rods), 5 nm (hollow portion), specific surface area 2,200 m$^2$g$^{-1}$. |
| SNU-1 | Chem. Commun. 1999, 2177. | Synthesized using MCM-48 as a template. Fine pore diameter 2 nm, specific surface area 1,300 m$^2$g$^{-1}$. |
| SNU-2 | Adv. Mater., 2000, 12, 359. | Synthesized using HMS as a template. Fine pore diameter 2 nm, specific surface area 1,100 m$^2$g$^{-1}$. |
| C-MCM41 | J. Am. Chem. Soc., 2000, 122, 10712. | Synthesized using MCM-41 as a template. Specific surface area 880 m$^2$g$^{-1}$. |
| C-Q10 | J. Am. Chem. Soc., 2000, 122, 10712. | Synthesized using Q-10 as a template. Fine pore diameter 8.1 nm, specific surface area 840 m$^2$g$^{-1}$. |

In addition to porous carbon materials prepared using mesoporous silica as a template, coke, phenol resins, and coconut shell can be heat treated and activated with an alkali or steam to obtain a porous carbon material for use. Specific examples of methods of preparing porous carbon materials of prescribed specific surface area and quantities of phenolic hydroxyl groups by activation with an alkali or steam are set forth below.

For example, when coke is employed as the starting material, the coke is heated for 1 to 20 hours, desirably 8 to 12 hours at 400 to 700° C. in a reducing atmosphere to carbonize it. It is desirable to conduct a first heat treatment at 400 to 600° C. and a second heat treatment at 600 to 700° C. When the heating temperature in the first heat treatment is less than 400° C., the thermal decomposition reaction is inadequate and carbonization tends not to proceed. When the heat treatment temperature exceeds 600° C., the heating temperature becomes identical to the second heat treatment and it becomes difficult to achieve a stepwise heating effect. When the heating temperature in the second heat treatment is less than 600° C., the heating temperature becomes identical to that in the first heat treatment, making it difficult to achieve a heating effect in the second heat treatment. When the heat treatment temperature exceeds 700° C., the activation in the subsequent step becomes difficult. In the first heat treatment, the rate of temperature rise is desirably 3 to 10° C./hour, preferably 4 to 6° C./hour. The maximum temperature is desirably maintained for 5 to 20 hours, preferably 8 to 12 hours. In the second heat treatment, the rate of temperature rise is desirably 10 to 100° C./hour, preferably 40 to 80° C./hour. The maximum temperature is desirably maintained for 1 to 20 hours, preferably 1 to 12 hours.

The alkali metal compound employed in the reaction during the subsequent alkali activation is not specifically limited. However, a hydroxide is preferred. Specific desirable examples are: sodium hydroxide, potassium hydroxide, and cerium hydroxide. The maximum temperature during the activation treatment normally falls within a range of 600 to 800° C., desirably within a range of 700 to 760° C.

When the maximum temperature during the activation treatment is excessively high, the quantity of residual metal increases, tending to negatively affect catalyst activity. Conversely, when the maximum temperature during the activation treatment is excessively low, the alkali activation reaction does not progress, making it difficult to obtain a carbon material with the desired surface functional groups.

The maximum temperature is desirably maintained during the activation treatment for 30 minutes or less. When the maximum temperature is maintained too long, it becomes difficult to obtain a carbon material with the desired surface functional groups.

After maintaining the maximum temperature as set forth above, cooling is conducted. The rate of temperature drop in cooling from a maximum temperature during activation treatment to 590° C. is desirably 60° C./hour or more. When the rate of temperature drop is too slow, it becomes difficult to obtain a carbon material with the desired surface functional groups.

In the above steps, by causing phenolic hydroxyl groups to adhere to the surface of the carbon material and retaining the phenolic hydroxyl groups that are present in the starting material, it is possible to keep the number of phenolic hydroxyl groups within the prescribed range.

Failure to remain within the ranges of temperature and duration in the above heat treatment conditions for chemical activation makes it difficult to control the number of surface functional groups in the porous carbon material within the desired range, and is thus undesirable.

From among the above porous carbon materials, those having a specific surface area of 800 m$^2$/g or greater can be employed in the present invention. From the perspective of providing a catalyst of high activity, the specific surface area is desirably 1,000 m$^2$/g or greater, preferably 1,100 m$^2$/g or greater. From the perspective of catalytic activity, there is no upper limit to the specific surface area. However, from the perspective of economic preparation, the upper limit is, for example, 2,500 m$^2$/g. Porous carbon materials exceeding this specific surface area are undesirable from an economic perspective.

Further, porous carbon materials that are suitable to the present invention have a number of phenolic hydroxyl groups of 100 mmol/kg or greater and 700 mmol/kg or less when the surface functional groups are determined by titration. Adequate catalytic activity is not achieved when the number of phenolic hydroxyl groups is less than 100 mmol/kg, and economic preparation is precluded when the number of phenolic hydroxyl groups exceeds 700 mmol/kg. The lower limit of the number of phenolic hydroxyl groups is desirably 120 mmol/kg or greater, preferably 150 mmol/kg or greater. The upper limit of the number of hydroxyl groups is desirably 650 mmol/kg or lower, preferably 600 mmol/kg or lower.

Figure 4:
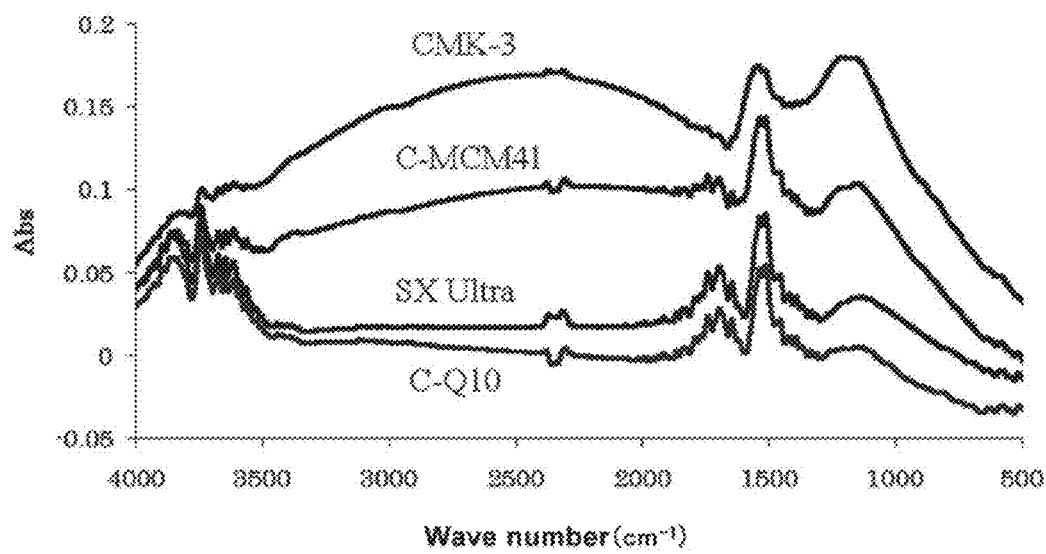
FIG. 4 Shows the results of transmission FT-IR spectral of the various carbon materials and activated carbon employed in the embodiments.

The porous carbon material desirable has infrared absorbance in the vicinity of 1,200 cm$^{-1}$. FIG. 4 shows examples (diluted to 0.1 mass % with KBr, measured on a disk on which circles 1 cm in diameter were formed) of the transmission FT-IR spectra of the porous carbon materials prepared in the embodiments. The infrared absorption at 1200 cm$^{-1}$±50 cm$^{-1}$ was absorption assigned to C—O stretching vibration and phenolic hydroxyl group bending vibration. As shown in FIG. 4, the porous carbon material employed in the present invention desirably has much stronger infrared absorption in the vicinity of 1,200 cm$^{-1}$ than common activated carbon. Specifically, taking a straight line drawn from the minimum value of the absorbance between 1,550 cm$^{-1}$ and 1,700 cm$^{-1}$ to the absorbance at 1,000 cm$^{-1}$ as a baseline, the difference between the baseline and the absorbance at 1,240 cm$^{-1}$ indicating the infrared absorption of the phenolic hydroxyl groups is adopted as the absorption of the phenolic hydroxyl groups. The absorbance of the phenolic hydroxyl groups was CMK-3: 0.060; C-MCM41: 0.026; SX Ultra: 0.009; and C-Q10: 0.013. The absorbance due to aromatic rings at 1,530 cm$^{-1}$ calculated using the same baseline was CMK-3: 0.049; C-MCM41: 0.057; SX Ultra: 0.062; and C-Q10: 0.053. The absorption due to aromatic rings did not change greatly for any of the carbon materials, and could thus be employed as a reference value. Accordingly, the value of the absorbance of the phenolic hydroxyl groups divided by the absorbance of the aromatic groups ($A_{PhOH/Ac}$) was calculated for each carbon material as follows: CMK-3: 1.2; C-MCM41: 0.46; SX Ultra: 0.15; and C-Q10: 0.25. In the present invention, carbon materials in which the ratio ($A_{PhOH}/A_C$) is 0.2 or greater are desirably employed, carbon materials having a ratio, carbon materials in which it is 0.3 or greater are preferably employed, and carbon materials in which it is 0.4 or greater are employed with even greater preference. The upper limit of the ratio ($A_{PhOH/Ac}$) is not specifically limited by the relation to catalytic activity, but can be 1.5 for example, and is desirably 1.4.

Figure 5:
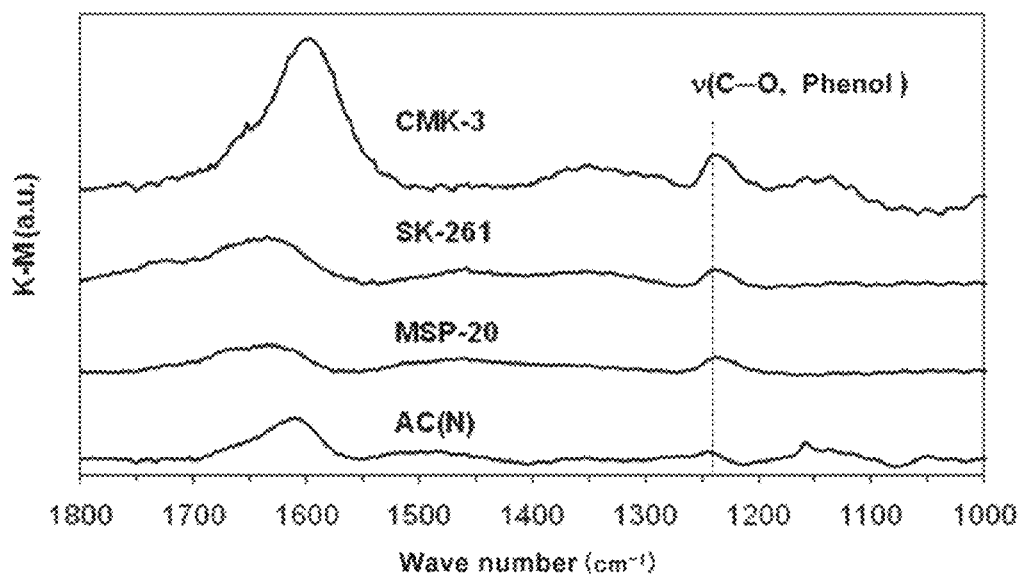
FIG. 5 Shows the results of diffuse reflectance FT-IR spectral of the various carbon materials and activated carbon employed in the embodiments.

FIG. 5 shows examples (diluted to 0.1 mass % with KBr, measured on a disk on which circles 1 cm in diameter were formed) of the diffuse reflectance FT-IR spectra of the porous carbon materials prepared in the embodiments. The measurement was conducted by packing the carbon material in a ceramic cup without dilution, irradiating the sample with modulated infrared light (interferogram) to produce diffuse reflectance, and using an integrating sphere to collect the light and guide it to an MCT detector. FIG. 5 shows spectra after Kubelka-Munk (K-M) function transformation. There is little significance to the absolute value of the K-M function and direct intensity comparison between spectra is impossible, so the absorption intensity was normalized by the following method.

The absorption intensity due to phenolic hydroxyl groups was defined as follows. Adopting a baseline in the form of a straight line connecting the K-M function values at 1,190 cm$^{-1}$ and 1,270 cm$^{-1}$, the difference between the K-M function value at 1,240 cm$^{-1}$ and the baseline was adopted as the absorption intensity of phenolic hydroxyl groups.

Further, the absorption intensity of aromatic rings was defined as follows. Adopting a baseline in the form of a straight line connecting the K-M function values at 1,540 cm$^{-1}$ and 1,750 cm$^{-1}$, the difference between the K-M function value at 1,615 cm$^{-1}$ and the baseline was adopted as the absorption intensity of aromatic rings.

The fact that the absorption intensity of aromatic rings per unit quantity of carbon was nearly constant was as set forth above. Accordingly, the density of phenolic hydroxyl groups in the carbon material could be expected to be proportional to the value of the absorption intensity of phenolic hydroxyl groups divided by the absorption intensity of aromatic rings (defined as the ratio PhOH/C). That is, the normalized value of the PhOH/C ratio reflected the density of the phenolic hydroxyl groups of the various carbon materials, allowing comparison. The PhOH/C ratios of various carbon materials were calculated as: CMK-3: 0.24; SK-261: 0.54; MSP-20: 0.78, and AC(N): 0.17. SK-261 and MSP-20, which exhibited high activity, also had high densities of phenolic hydroxyl groups. CMK-3, with comparable high activity, and AC(N), with low activity, had lower densities of phenolic hydroxyl groups. A good correlation was obtained. That is, all carbon materials exhibiting good catalytic activity desirably have a PhOH/C ratio of 0.2 or greater, preferably 0.3 or greater, more preferably 0.4 or greater, and optimally, 0.5 or greater. The upper limit of the PhOH/C ratio is not specifically limited for the catalytic activity relation, but, for example, can be 1, desirably 0.9.

The porous carbon materials employed in the present invention thus has surface phenolic hydroxyl groups, and the quantity thereof is markedly greater than that of common activated carbon. Hydroxyl groups are generally known to have a high degree of affinity for cellulose molecules. Thus, porous carbon materials having a large number of phenolic hydroxyl groups can be presumed to exhibit a high degree of affinity for cellulose and to exhibit new acidic centers. Thus, in the second aspect of the present invention, the porous carbon material is thought to exhibit high catalytic activity in the hydrolysis of cellulose without having been treated with sulfuric acid.

Porous carbon materials that are suited to use in the present invention desirably have an average secondary particle diameter (d50 (based on volume)) (50% particle diameter) of 1 μm or greater and 30 μm or less, preferably 2 μm or greater and 30 μm or less, and more preferably, 4 μm or greater and 15 μm or less. By using a porous carbon material with an average secondary particle diameter of 30 μm or less, adequate catalytic activity can be achieved, and by using one with an average secondary particle diameter of 1 μm or greater, economic preparation is possible, both of which are desirable.

Further, in the first aspect of the present invention, the transition metal that is supported on the porous carbon material is, for example, at least one member selected from the group consisting of ruthenium, platinum, rhodium, palladium, iridium, nickel, cobalt, iron, copper, silver, and gold. These transition metals may be employed singly, or in combinations of two or more. From the perspective of high catalytic activity, the transition metal is desirably selected from among the platinum group of metals consisting of ruthenium, platinum, rhodium, palladium, and iridium. From the perspective of the cellulose conversion rate and glucose selectivity, it is preferably selected from among ruthenium, platinum, palladium, and rhodium.

The transition metal is suitably supported on the surface of the porous carbon materials with a dispersion of 0.01 to 0.95, desirably 0.1 to 0.9, and preferably, 0.3 to 0.8. When the dispersion is too lower, the reaction rate decreases. The dispersion of the transition metal can be adjusted as below. It can be adjusted by the amount of transition metal compound employed as the starting material, and the temperature conditions during hydrogen reduction (rate of temperature rise and maximum temperature).

The amount of transition metal that is supported on the porous carbon can be suitably determined in consideration of the type and the dispersion of the transition metal, and is, for example, suitably 0.01 to 50 mass percent, desirably 0.01 to 30 mass percent, and more preferably, 0.01 to 10 mass percent, of the catalyst.

The catalyst can be produced by referencing conventional methods for preparing supported metal solid catalysts. For example, preparation is possible in the following manner by the impregnation method. The support is vacuum dried for one hour at 150° C. Next, water is added to prepare a dispersion liquid. To this is added an aqueous solution containing a prescribed quantity of a metal salt and the mixture is stirred for 15 hours. Subsequently, the water is evaporated off under reduced pressure to obtain a solid, which is reduced for 2 hours at 400° C. under a hydrogen gas flow to obtain a catalyst in solid form (see the flowchart below).

The catalyst employed in the present invention can be in the form of a single metal supported on a single porous carbon material support, or can be in the form of multiple metals supported on a single support. Further, two or more of such single metals supported on single supports or such multiple metals supported on single supports can be compounded, such as by mixing, for use. The compounding of two or more types for use sometimes enhances the cellulose conversion rate and glucose selectivity. As a result, a high glucose yield can sometimes be achieved. The combination of metals and supports when compounding two or more types for use can be suitably selected taking into account the type of cellulose employed as starting material, the hydrolysis conditions, the types of other catalysts (metal and support) used in combination, and the like. The same applies when employing a catalyst comprised of multiple metals supported on a single support.

The catalysts of the first and second aspects of the present invention can both be employed in reactions generating oligosaccharides and glucose by heating cellulose in the presence of water. The catalysts of the first and second aspects of the present invention can be employed in reactions generating sugars by heating hemicellulose in the presence of water. The various reactions will be described further below.

The Method for Producing a Sugar-Containing Solution Comprised Mainly of Glucose The present invention comprises a method for producing a sugar-containing solution comprised mainly of glucose using the catalyst of the first aspect of the present invention and the catalyst of the second aspect of the present invention. This production method comprises hydrolyzing cellulose in the presence of at least one catalyst of the present invention and water to produce at least oligosaccharides and glucose. The reaction of hydrolyzing cellulose to produce glucose is indicated in simplified form below. In reality, it is thought that when cellulose is hydrolyzed, oligosaccharides are produced and then the oligosaccharides are then hydrolyzed to form glucose. In the present invention, the catalyst of the first aspect, the catalyst of the second aspect, or both are employed to produce a sugar-containing solution comprised mainly of glucose. The reaction mechanism has not been fully elucidated, but the contributions to each reaction (hydrolysis of cellulose, oligosaccharides, and the like) of the catalytic action of the catalyst of the second aspect, comprised of just a porous carbon material, and the catalytic action of the catalyst of the first aspect of the present invention, in which a metal is supported on a porous carbon material, are thought to differ within the range of test results indicated in the embodiments. However, this contribution is thought to vary with the reaction conditions (temperature, duration, and variation in temperature).

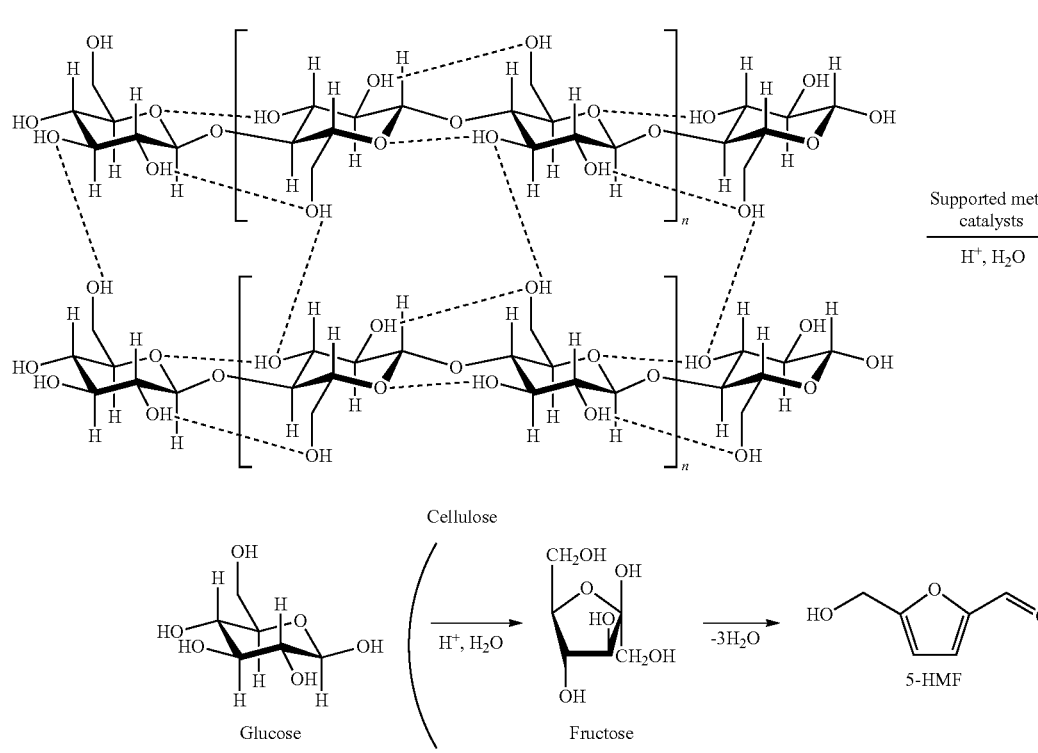

[Chem. 1]

The above scheme shows a cellulose hydrolysis reaction employing the catalyst of the first aspect (the supported metal catalyst). The cellulose hydrolysis reaction employing the catalyst of the second aspect is identical.

More specifically, when cellulose is hydrolyzed employing either the catalyst of the first aspect or the catalyst of the second aspect, oligosaccharides in the form of tetramers and higher, cellotriose, cellobiose, and the like are produced in addition to glucose. Further, glucose, which is a product of the hydrolysis, further reacts to produce mannose, fructose, levoglucosan, 5-hydroxymethylfurfural, furfural, and the like. The sugar-containing solution obtained in the present invention contains these hydrolysis products of cellulose, including glucose, and by-products derived from the glucose that is produced. However, the main component is glucose. The term "main component" means the component present in the greatest quantity by mass among the solid components or solutions (which are reaction products). However, as set forth above, both the catalyst of the first aspect and the catalyst of the second aspect contribute in differing degrees to the various reactions (hydrolysis of cellulose, hydrolysis of oligosaccharides, and the like). As a result, the composition of the product varies.

By conducting the hydrolysis of cellulose under prescribed conditions for example, the conversion rate of the hydrolysis of cellulose can be kept to within a range of 10 to 100%, desirably to within a range of 30 to 100%, preferably to within a range of 40 to 100%, more preferably to a range of 50 to 100%, and optimally, to within a range of 55 to 100%. Further, the selectivity of glucose can be kept to within a range of 20 to 80%, desirably to within a range of 25 to 80%, preferably to within a range of 30 to 80%, and optimally, to within a range of 40 to 80%. Further, the selectivity of 5-hydroxymethylfurfural can be kept to 8% or lower, desirably 6% or lower, preferably 5% or lower, and optimally, to 4% or lower. 5-hydroxymethylfurfural is known to be a substance that inhibits fermentation when it is employed in the step of fermenting saccharides of cellulose. Since the production method of the present invention yields a sugar-containing solution with low 5-hydroxymethylfurfural selectivity, the present invention can produce advantageous sugar-containing solutions with little inhibition when employed in the fermentation step, making it extremely useful.

The hydrolysis of cellulose is normally conducted by heating cellulose in the presence of a catalyst and water in a sealed vessel under ordinary pressure to a temperature at which the partial pressure of steam, for example, reaches a pressurized state exceeding 0.1 MPa. The temperature of the heating yielding a pressurized state suitably falls, for example, within a range of 110 to 380° C. From the perspectives of rapidly hydrolyzing cellulose and inhibiting the conversion of the product in the form of glucose into other sugars, a relatively high temperature is desirable, such as 170 to 320° C.; 200 to 300° C. is preferred; 210 to 260° C. is of greater preference; and a range of 215 to 250° C. is optimal. Since the hydrolysis of cellulose in the production method of the present invention is normally conducted in a sealed vessel such as an autoclave, at the start of the reaction, even at ordinary pressure, a pressurized state is achieved when the reaction system is heated to the above temperature. Further, the interior of the sealed vessel can be pressurized prior to the reaction or during the reaction to promote the reaction. The level of pressurization can be, for example, 0.1 to 30 MPa, desirably 1 to 20 MPa, and preferably, 2 to 10 MPa. In addition to employing a sealed vessel, a high-pressure pump can be employed to heat and pressurize the reaction solution while causing it to flow through a reactor packed with catalyst to promote the reaction. Alternatively, a reaction solution in which catalyst has been dispersed with a high-pressure pump can be heated and pressurized while causing it to flow through the reactor to promote the reaction. The catalyst that is dispersed in the reaction solution can be recovered and reused after the end of the reaction.

The quantity of water present for hydrolysis can be at least a quantity capable of hydrolyzing the entire quantity of cellulose, preferably falling within a mass ratio range relative to the cellulose of 1 to 500 taking into account the fluidity, stirring properties, and the like of the reaction mixture.

The quantity of catalyst employed can be suitably determined based on the activity of the catalyst and the reaction conditions (such as temperature and duration). For example, a quantity falling within a mass ratio range of 0.005 to 5 relative to the cellulose is suitable.

The atmosphere of hydrolysis can be air. The use of air is industrially desirable. However, gases other than air, such as oxygen, nitrogen, hydrogen, and mixtures thereof (other than air) are possible.

It is desirable from the perspective of increasing the yield of glucose that the heating for hydrolysis be ended at a point in time when the conversion rate of the cellulose by hydrolysis has reached between 10 to 100% and the selectivity of glucose has reached between 20 to 80%. Since the point in time when the conversion rate due to hydrolysis of cellulose reaches between 10 to 100% and the selectivity of glucose reaches between 20 to 80% varies with the heating temperature, type and quantity of catalyst employed, quantity of water (ratio relative to the cellulose), type of cellulose, method and conditions of stirring, and the like, it can be experimentally determined based on these conditions. Under normal conditions, it falls, for example, within a range of 5 to 60 minutes, desirably a range of 5 to 30 minutes, from the start of heating to produce the hydrolysis reaction. However, limitation to this range is not intended. Further, the heating for produce hydrolysis is desirably ended at a point in time when the conversion rate by hydrolysis of cellulose falls within a range of 30 to 100%, preferably when it falls within a range of 40 to 100%, more preferably when it falls within a range of 50 to 100%, and optimally when it falls within a range of 55 to 100%, and desirably when the selectivity of glucose falls within a range of 25 to 80%, preferably when it falls within a range of 30 to 80%, and optimally when it falls within a range of 40 to 80%.

The hydrolysis reaction can be conducted in batch-mode or continuous-mode, or the like. The reaction is desirably conducted while stirring the reaction mixture.

The hydrolysis reaction can be conducted for a relatively short period at a relatively high temperature in the present invention to produce a sugar-containing solution with a low content of 5-hydroxymethylfurfural and comprising mainly glucose.

Following the end of heating, cooling the reaction solution is desirable from the perspective of inhibiting the conversion of glucose to other sugars and increasing the glucose yield. Cooling the reaction solution under conditions that maintain a glucose selectivity of between 20 to 80% is desirable from the perspective of increasing the glucose yield. Keeping it within a range of 25 to 80% is preferable, keeping it within a range of 30 to 80% is more preferable, and keeping it to within a range of 40 to 80% is optimal. Cooling the reaction solution as quickly as possible to a temperature at which the conversion of glucose to other sugars essentially does not take place is desirable from the perspective of increasing the glucose yield. It is desirably conducted at a rate falling within a range of 1 to 200° C./minute, preferably at a rate falling within a range of 10 to 150° C./minute. The temperature at which the conversion of glucose to other sugars essentially does not take place is, for example, 150° C., desirably 110° C. That is, cooling of the reaction solution to a temperature of 150° C. is suitably conducted at a rate falling within a range of from 1 to 200° C./minute, desirably falling within a range of 10 to 150° C./minute. Cooling to a temperature of 110° C. is more suitably conducted at a rate falling within a range of 1 to 200° C./minute, desirably within a range of 10 to 150° C.

The hydrolysis reaction can be conducted under such conditions to keep the selectivity of 5-hydroxymethylfurfural to 8% or lower, desirably 6% or lower, preferably 5% or lower, and optimally, 4% or lower.

The cellulose serving as the raw material is not specifically limited; commercially available cellulose in powder form can be employed as is. The cellulose is of plant form, and may be, for example, water-insoluble cellulose obtained by bleaching a defatted wood powder with a chlorine treatment to obtain a chemical pulp (holocellulose), which is then subjected to an alkali treatment to remove the hemicellulose.

Generally, in cellulose, two or more cellulose units are bonded together by hydrogen bonds and exhibit crystallinity. In the present invention, cellulose exhibiting such crystallinity can be employed as the starting material, or such crystalline cellulose can be treated to reduce the crystallinity and the resulting cellulose of reduced crystallinity can be employed. The cellulose of reduced crystallinity can be cellulose the crystallinity of which has been partially reduced, or cellulose in which the crystallinity has been completely, or nearly completely, eliminated. The type of processing used to reduce crystallinity is not specifically limited, but a crystallinity-reducing process capable of cleaving the above hydrogen bonds and at least partially producing single-chain cellulose is desirable. The use of a starting material in the form of cellulose at least partially comprising single-chain cellulose efficiently enhances the efficiency of hydrolysis.

The process used to reduce the crystallinity of the starting material cellulose can be a method of obtaining single-chain cellulose by physically cleaving the hydrogen bond of cellulose such as a ball mill processing (see H. Zhao, J. H. Kwak, J. A. Franz, J. M. White, J. E. Holladay, *Energy & Fuels*, 20, 807 (2006), the entire contents of which are hereby incorporated by reference herein), or a method of obtaining single-chain cellulose by chemically cleaving the hydrogen bond of cellulose such as a phosphoric acid processing (see Y.-H. P. Zhang, J. Cui, L. R. Lynd, L. Kuang, *Biomacromolecules*, 7, 644 (2006), the entire contents of which are hereby incorporated by reference herein), for example. Even when the processing to reduce the crystallinity of cellulose does not completely eliminate the crystallinity of the cellulose, the efficiency of hydrolysis is greatly enhanced by employing cellulose as the starting material, the crystallinity of which has been partially reduced comparing to that prior to such processing.

A further example of a process for reducing the crystallinity of cellulose is processing with pressurized hot water (see Nobuyuki Hayashi, Shuji Fujita, Takero Irie, Tsuyoshi Sakamoto, Masao Shibata, *J. Jpn. Inst. Energy*, 83, 805 (2004), and M. Sasaki, Z. Fang, Y. Fukushima, T. Adschiri, K. Arai, *Ind. Eng. Chem. Res.*, 39, 2883 (2000), the entire contents of which are hereby incorporated by reference herein).

Following the hydrolysis, the reaction mixture is cooled and subjected to solid-liquid separation, a saccharide-containing aqueous solution which contains glucose as the main component is recovered as a liquid phase, and solids including at least the catalyst and unreacted cellulose are separated out as the solid phase. The method of solid-liquid separation is not specifically limited, and may be suitably determined based on the usual methods in consideration of the shape and form of the catalyst, the amount of unreacted cellulose present, and the like. For example, methods such as filtration, centrifugation, and precipitation can be employed. The solid containing the catalyst and unreacted cellulose can be employed in the next reaction as they are.

The catalyst does not specifically require activation for reuse. However, for example, the usual activation of supported metal solid catalysts can be employed prior to reuse. In the catalyst activation process, the catalyst can be washed with water and dried, and residual organic compounds on the metal and support can be removed by thermal decomposition with heating at 200 to 500° C. for 1 to 5 hours under a hydrogen gas flow while returning the surface of the supported metal to a reduced state for use.

The Method for Producing a Sugar-Containing Solution Comprised Mainly of Sugar

The present invention includes a method for producing a sugar-containing solution comprised mainly of sugar using the catalyst of the present invention. This production method comprises hydrolyzing hemicellulose in the presence of at least one of the catalysts of the present invention and water to produce at least sugar.

Hemicellulose is comprised of glucose, galactose, xylose, mannose, arabinose, fructose, and the like. Hydrolyzing hemicellulose with the catalyst of the present invention permits the synthesis of monosaccharides and oligosaccharides.

Examples of the sugars that are obtained by the method of the present invention are glucose, mannose, arabinose, xylose, galactose, and fructose.

The hemicellulose can be hydrolyzed in nearly the same fashion as the cellulose set forth above. However, hemicellulose generally hydrolyzes more readily than cellulose. Thus, a reaction temperature falling within a range of 60 to 300° C. is suitable, for example. From the perspectives of rapidly hydrolyzing hemicellulose and inhibiting the conversion of the sugar products to other compounds, the reaction temperature is suitably, for example, 80 to 260° C., desirably 100 to 250° C., and preferably falls within a range of 120 to 240° C.

Embodiments

The present invention is described more specifically below with reference to embodiments. However, it is not intended for the present invention to be limited by the embodiments.
A. Evaluation of a Catalyst Employing a Porous Carbon Material Having a Form in which Mesoporous Silica is Employed as a Template and the Fine Pores of Mesoporous Silica are Filled with Carbon
(1) Preparation of Catalyst and Amorphous Cellulose The method of synthesizing CMK-3 is described. SBA-15 was impregnated with sucrose in diluted sulfuric acid, and the solid residue was carbonized at 160° C. This treatment was repeated twice, after which a heat treatment was conducted at 900° C. under a nitrogen flow. The solid obtained was stirred in hydrofluoric acid to remove the silica, yielding CMK-3.

CMK-1 was synthesized by the same method using MCM-48 as a template.

A supported metal catalyst was prepared by the impregnation method. Specifically, a carrier was dispersed in water, a precursor of the metal to be supported in the form of an aqueous solution of ruthenium chloride ($RuCl_2 \cdot 3H_2O$) was added, and the mixture was stirred for 16 hours. The water was distilled off under reduced pressure. When a carbon carrier was employed, the catalyst precursor was hydrogen reduced at 400° C. for two hours. When an inorganic oxide support was employed, the catalyst precursor was calcined in oxygen for two hours at 400° C. and similarly hydrogen reduced to prepare a supported metal catalyst. The quantity of metal supported was about two mass %.

A reaction substrate in the form of cellulose that had been treated as follows was employed. To a ceramic pot mill were charged 1 kg of zirconia beads 1 cm in diameter and 10 g of cellulose (Merck, Avicel). This was then set on the rotating base of a benchtop pot mill and subjected to ball mill processing for 96 hours at 60 rpm. This treatment decreased the degree of crystallization of the cellulose from about 65% to about 10%. Amorphous cellulose exhibits higher reactivity than crystalline cellulose and can be efficiently hydrolyzed.

(2) The Reaction Method

The cellulose hydrolysis reaction was conducted by charging 324 mg of cellulose (2.0 mmol in units of $C_6H_{10}O_5$), 50 mg of catalyst (10 µmol of supported metal), and 40 mL of water to a high-pressure reactor (internal volume 100 mL, MMJ-100 made by OM Labotech Corp. of Hastelloy). While stirring at 600 rpm, the mixture was heated from room temperature to 230° C. over about 15 minutes. The heating was stopped when 230° C. was reached, and the mixture was cooled. FIG. 1 shows the typical change in temperature over time within the reactor.

After cooling, the reaction solution was separated into liquid and solid in a centrifugal separator. The liquid phase product was quantitatively analyzed by high-performance liquid chromatography (HPLC, Shimadzu LC-10ATVP; column: Phenomenex Rezex RPM Monosaccharide Pb++ (8%); mobile phase: water, 0.6 mL/min, 80° C.; differential refractive index detector). Further, the solid residue was dried for 24 hours at 110° C. and the cellulose conversion was calculated from the mass of the unreacted cellulose. The formulas used to calculate the yield, cellulose conversion, and glucose selectivity are given below.

Soluble component yield (%)=(quantity of carbon of target component)/(quantity of carbon of added cellulose)×100

Cellulose conversion (%)=[1−(mass of recovered cellulose)/(mass of added cellulose)]×100

Glucose selectivity (%)=(glucose yield)/(cellulose conversion rate)×100

(3) Cellulose Hydrolysis Reaction

The results of cellulose hydrolysis reactions conducted with Ru-supporting catalysts prepared with various carbon carriers are given in Tables 2 and 3. Ru/CMK-3 exhibited the highest catalytic activity, with a cellulose conversion of 62%, a glucose yield of 26%, and a glucose selectivity of 42 (Run 2 (Embodiment 1)). Ru/CMK-1 exhibited about the same degree of activity as Ru/CMK-3 (Run 6 (Embodiment 5)): a cellulose conversion of 55%, a glucose yield of 25%, and a glucose selectivity of 45%. When the reaction temperature was raised, the glucose yield dropped (Runs 7 and 8 (Embodiments 6 and 7)). Ru/activated carbon and Ru/$C_{60}$ (Runs 12 to 14 (Comparative Examples 2 to 4)) exhibited low activity that did not differ greatly from when no catalyst was employed (Run 1 (Comparative Example 1)), the cellulose conversion was 30%, the glucose yield was 4%, and the glucose selectivity was 15%. CMK-1 and CMK-3 not supporting Ru exhibited high activity in cellulose hydrolysis, but the oligomer (cellooligosaccharides) selectivity was high (described in detail in section (5)).

TABLE 2

| Run | Catalyst | Product yield (%, based on carbon) | | | | | |
|---|---|---|---|---|---|---|---|
| | | Tetramer or higher | Cellotriose | Cellobiose | Glucose | Mannose | Fructose |
| 1 | None | 6.6 | 3.2 | 3.3 | 4.3 | 0.5 | 0.9 |
| 2 | Ru/CMK-3 | 0 | 6.0 | 8.0 | 25.7 | 1.2 | 1.8 |
| 3 | Ru/CMK-3[d] | 1.3 | 2.7 | 5.6 | 27.0 | 0.9 | 1.8 |
| 4 | Ru/CMK-3[e] | 0.8 | 1.2 | 3.0 | 32.2 | 1.0 | 1.7 |
| 5 | Ru/CMK-3[f] | 0 | 0 | 3.6 | 29.4 | 1.0 | 2.0 |
| 6 | Ru/CMK-1 | 0.9 | 2.8 | 6.2 | 24.9 | 1.1 | 1.6 |
| 7 | Ru/CMK-1[g] | 1.4 | 3.0 | 5.9 | 23.5 | 1.1 | 2.6 |
| 8 | Ru/CMK-1[h] | 1.8 | 3.6 | 6.4 | 21.9 | 1.0 | 1.8 |
| 9[b] | Ru/CMK-1 | 1.9 | 4.5 | 6.0 | 15.9 | 1.0 | 2.3 |
| 10 | Ru/C-MCM41 | 4.6 | 5.0 | 6.7 | 14.2 | 0.8 | 1.1 |
| 11 | Ru/C-Q10 | 3.2 | 4.5 | 6.7 | 18.4 | 0.9 | 1.3 |
| 12 | Ru/Activated carbon[i] | 6.6 | 5.5 | 6.5 | 12.8 | 0.8 | 1.0 |
| 13 | Ru/Activated carbon[j] | 6.4 | 4.5 | 5.2 | 9.2 | 0.4 | 0.6 |
| 14 | Ru/$C_{60}$ | 7.8 | 3.5 | 3.4 | 4.7 | 0.7 | 0.6 |
| 15 | Ru/$\gamma Al_2O_3$[k] | 1.8 | 2.5 | 4.3 | 23.6 | 1.1 | 3.0 |
| 16 | Ru/$TiO_2$[l] | 4.6 | 4.4 | 5.6 | 11.4 | 0.6 | 1.3 |
| 17 | Ru/$TiO_2$[m] | 7.4 | 3.6 | 3.5 | 4.6 | 0.7 | 0.7 |
| 18 | Ru/$ZrO_2$[n] | 3.2 | 3.6 | 5.3 | 13.7 | 1.2 | 2.1 |
| 19 | Ru/$ZrO_2$[o] | 7.6 | 3.4 | 3.3 | 4.2 | 0.7 | 0.7 |
| 20 | Ru/HUSY(40)[p] | 0 | 7.5 | 1.5 | 5.4 | 0 | 0.5 |
| 21 | Ru/MCM-41[q] | 7.2 | 10.8 | 3.0 | 4.2 | 0 | 0.4 |

| Run | Catalyst | Product yield (%, based on carbon) | | | Total yield | Cellulose Conversion (%) | Glucose Selectivity (%) |
|---|---|---|---|---|---|---|---|
| | | Levoglucosan | 5-HMF[r] | Furfural | | | |
| 1 | None | 0.1 | 1.7 | 0.4 | 21.0 | 29.5 | 14.6 |
| 2 | Ru/CMK-3 | 1.5 | 2.8 | 0.5 | 47.2 | 61.6 | 41.7 |
| 3 | Ru/CMK-3[d] | 1.6 | 2.5 | 0.2 | 43.5 | 64.8 | 41.6 |
| 4 | Ru/CMK-3[e] | 2.2 | 1.8 | 0.3 | 44.2 | 69.9 | 48.6 |

TABLE 2-continued

| | | | | | | | |
|---|---|---|---|---|---|---|---|
| 5 | Ru/CMK-3[f] | 1.6 | 2.0 | 0 | 39.5 | 63.0 | 46.6 |
| 6 | Ru/CMK-1 | 1.6 | 2.9 | 0.4 | 42.4 | 55.2 | 45.1 |
| 7 | Ru/CMK-1[g] | 1.5 | 3.0 | 0.5 | 42.4 | 58.2 | 40.4 |
| 8 | Ru/CMK-1[h] | 1.3 | 3.1 | 0.6 | 41.6 | 58.2 | 37.6 |
| 9[b] | Ru/CMK-1 | 0.7 | 2.4 | 0.4 | 31.1 | 50.0 | 31.8 |
| 10 | Ru/C-MCM41 | 0.8 | 1.9 | 0.3 | 35.4 | 51.6 | 27.5 |
| 11 | Ru/C-Q10 | 1.1 | 2.5 | 0.4 | 39.0 | 53.1 | 34.6 |
| 12 | Ru/Activated carbon[i] | 0.7 | 1.8 | 0.2 | 35.8 | 44.1 | 29.0 |
| 13 | Ru/Activated carbon[j] | 0 | 1.0 | 0 | 27.1 | 42.8 | 21.4 |
| 14 | Ru/C$_{60}$ | 0.2 | 1.9 | 0.5 | 23.2 | 32.7 | 14.2 |
| 15 | Ru/γ-Al$_2$O$_3$[k] | 1.0 | 5.1 | 1.2 | 43.7 | 56.7 | 41.5 |
| 16 | Ru/TiO$_2$[l] | 0.5 | 2.9 | 0.7 | 32.2 | 43.5 | 26.2 |
| 17 | Ru/TiO$_2$[m] | 0.3 | 2.0 | 0.5 | 23.3 | 35.4 | 12.9 |
| 18 | Ru/ZrO$_2$[n] | 0.8 | 4.1 | 0.6 | 34.5 | 51.3 | 26.7 |
| 19 | Ru/ZrO$_2$[o] | 0.2 | 1.9 | 0.5 | 22.4 | 31.6 | 13.2 |
| 20 | Ru/HUSY(40)[p] | 0 | 2.0 | 0 | 16.9 | 34.5 | 15.6 |
| 21 | Ru/MCM-41[q] | 0 | 1.6 | 0 | 27.2 | 32.1 | 13.0 |

[a] Reaction conditions: cellulose 324 mg (processed in a ball mill for 4 days), catalyst 50 mg (2 mass % quantity of supported metal), water 40 mL, cooled immediately following heating to 230° C.
[b] SUS-316 reactor
[c] SUS-316 reactor, 10 atm N$_2$ atmosphere
[d] 5 mass % Ru/CMK-3
[e] 10 mass % Ru CMK-3
[f] Quantity of catalyst: 100 mg
[g] 200° C. hydrogen reduction
[h] 300° C. hydrogen reduction
[i] Activated carbon: Norit SX Ultra
[j] Activated carbon: Wako Pure Chemical Industries activated carbon powder
[k] Al$_2$O$_3$: reference catalyst of the Catalysis Society of Japan: JRC-ALO-2
[l] TiO$_2$: Degussa, P-25
[m] TiO$_2$: Merck
[n] ZrO$_2$: reference catalyst of the Catalysis Society of Japan: JRC-ZRO-2
[o] ZrO$_2$: Wako Pure Chemical Industries
[p] HUSY(40): Zeolyst, CBV780, Si/Al = 40
[q] MCM-41: Aldrich
[r] 5-Hydroxymethylfurfural

TABLE 3

| Run | Catalyst | Product yield (%, based on carbon) | | | | | |
|---|---|---|---|---|---|---|---|
| | | Tetramer or higher | Cellotriose | Cellobiose | Glucose | Mannose | Fructose |
| 1 | None | 6.6 | 3.2 | 3.3 | 4.3 | 0.5 | 0.9 |
| 22 | CMK-3 | 4.1 | 7.0 | 9.4 | 19.0 | 1.3 | 1.8 |
| 23[b] | CMK-3 | 7.2 | 6.2 | 6.7 | 9.5 | 0.8 | 1.6 |
| 24[c] | CMK-3 | 3.3 | 6.2 | 8.5 | 16.8 | 0.9 | 2.1 |
| 25 | CMK-1 | 5.3 | 6.2 | 7.7 | 14.1 | 1.0 | 1.4 |
| 26 | C-MCM41 | 6.7 | 5.6 | 6.4 | 10.3 | 0.7 | 1.0 |
| 27 | C-Q10 | 6.7 | 4.6 | 5.1 | 8.2 | 0.7 | 0.9 |
| 28 | Activated Carbon[i] | 7.2 | 4.2 | 4.4 | 5.9 | 0.7 | 0.8 |

| Run | Catalyst | Product yield (%, based on carbon) | | | Total yield | Cellulose Conversion (%) | Glucose Selectivity (%) |
|---|---|---|---|---|---|---|---|
| | | Levoglucosan | 5-HMF[r] | Furfural | | | |
| 1 | None | 0.1 | 1.7 | 0.4 | 21.0 | 29.5 | 14.6 |
| 22 | CMK-3 | 1.1 | 4.0 | 0.5 | 48.3 | 56.8 | 33.5 |
| 23[b] | CMK-3 | 0.4 | 2.4 | 0.7 | 35.5 | 46.3 | 20.5 |
| 24[c] | CMK-3 | 0.9 | 4.1 | 0.6 | 43.3 | | |
| 25 | CMK-1 | 0.6 | 2.9 | 0.4 | 39.6 | 48.6 | 29.0 |
| 26 | C-MCM41 | 0.5 | 2.5 | 0.3 | 34.0 | 47.6 | 21.7 |
| 27 | C-Q10 | 0.4 | 2.2 | 0.3 | 29.1 | 39.2 | 20.9 |
| 28 | Activated Carbon[i] | 0.2 | 1.3 | 0.2 | 25.0 | 32.3 | 18.1 |

See the footnote on Table 2.

When inorganic oxides in the form of γ-Al$_2$O$_3$, TiO$_2$, ZrO$_2$, HUSY(40), and MCM-41 carriers were employed, Ru/γ-Al$_2$O$_3$ exhibited somewhat lower activity than Ru/CMK-3. The other catalysts exhibited low activity (Runs 15 to 21 (Comparative Examples 5 to 11)).

(4) Test of Recycle of Catalyst

The catalysts Ru/CMK-3 and Ru/γ-Al$_2$O$_3$, which exhibited high activity, were repeatedly employed in cellulose hydrolysis reactions to examine catalyst durability.

TABLE 4

Study on recycle ability of supported metal catalyst in cellulose hydrolysis reaction

| Run | Catalyst | Product yield (%, based on carbon) | | | | |
|---|---|---|---|---|---|---|
| | | Tetramer or higher | Cellotriose | Cellobiose | Glucose | Mannose |
| 29 | Ru/CMK-3 First Recycle | 1.7 | 3.9 | 7.1 | 23.8 | 1.2 |
| 30[b] | Ru/CMK-3 Second Recycle | 5.0 | 7.3 | 10.0 | 25.0 | 1.3 |
| 31[b] | Ru/CMK-3 Third Recycle | 7.5 | 8.3 | 10.7 | 23.5 | 1.3 |
| 32 | Ru/γ-$Al_2O_3$ First Recycle | 0 | 0.6 | 2.7 | 22.2 | 0.7 |
| 33[b] | Ru/γ-$Al_2O_3$ Second Recycle | 6.5 | 4.0 | 4.4 | 7.1 | 0 |
| 34[b] | Ru/γ-$Al_2O_3$ Third Recycle | 7.3 | 5.1 | 5.9 | 10.3 | 0.9 |
| 35 | CMK-3 First Recycle | 4.7 | 7.2 | 9.0 | 17.2 | 1.1 |
| 36[b] | CMK-3 Second Recycle | 7.2 | 7.8 | 9.7 | 18.9 | 1.1 |
| 37[b] | CMK-3 Third Recycle | 7.8 | 8.0 | 9.5 | 17.8 | 1.1 |

| Run | Catalyst | Product yield (%, based on carbon) | | | | |
|---|---|---|---|---|---|---|
| | | Fructose | Levoglucosan | 5-HMF[c] | Furfural | Total yield |
| 29 | Ru/CMK-3 First Recycle | 1.6 | 1.5 | 3.4 | 0.6 | 44.7 |
| 30[b] | Ru/CMK-3 Second Recycle | 1.9 | 1.5 | 4.9 | 0.8 | 57.6 |
| 31[b] | Ru/CMK-3 Third Recycle | 1.8 | 1.3 | 4.3 | 0.7 | 59.2 |
| 32 | Ru/γ-$Al_2O_3$ First Recycle | 2.6 | 1.3 | 5.0 | 0 | 35.2 |
| 33[b] | Ru/γ-$Al_2O_3$ Second Recycle | 0.8 | 0 | 2.2 | 0 | 25.0 |
| 34[b] | Ru/γ-$Al_2O_3$ Third Recycle | 1.2 | 0 | 2.9 | 0 | 33.6 |
| 35 | CMK-3 First Recycle | 1.6 | 0.8 | 3.6 | 0.6 | 45.8 |
| 36[b] | CMK-3 Second Recycle | 1.7 | 0.9 | 4.8 | 0.7 | 52.8 |
| 37[b] | CMK-3 Third Recycle | 1.6 | 0.8 | 4.6 | 0.8 | 52.0 |

Figure 2:
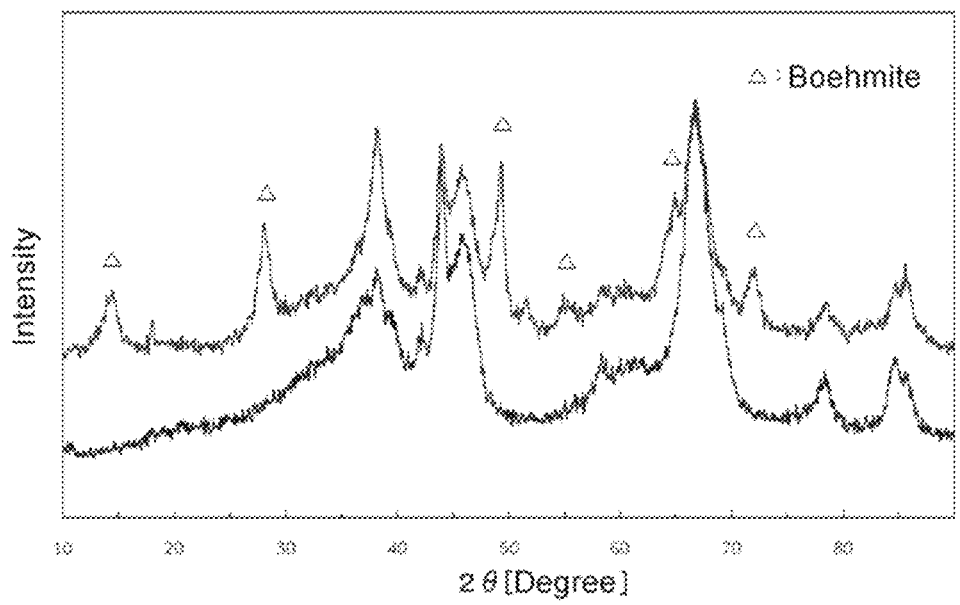
FIG. 2 Shows XRD patterns (bottom: prior to use; top: after use for reaction) of the Ru/γ—$Al_2O_3$ catalyst employed in the embodiments.

[a] Reaction conditions are identical with those of Table 2.
[b] Solid residue from the reaction just before was employed as the catalyst
[c] 5-Hydroxymethylfurfural As shown in Table 4, when Ru/CMK-3 was used in three reaction cycles, the glucose yield was constant at 24 to 25% and the catalytic activity did not drop at all (Runs 29 to 31 (Embodiments 17 to 19)). However, when Ru/γ-$Al_2O_3$ was employed, the glucose yield was 22% in the first reaction cycle, but dropped to 7% in the second reaction cycle and was similarly low in the third cycle (Runs 32 to 34 (Comparative Examples 13 to 15)). As shown in FIG. 2, in 230° C. hot water, the activity was thought to drop because the γ-$Al_2O_3$ changed to Boehmite (AlO(OH)). When CMK-3 not supporting Ru was employed in three reaction cycles, the catalytic activity did not drop at all (Runs 35 to 37 (Embodiments 20 to 22)).

Based on the above results, mesoporous carbon and mesoporous carbon-supported Ru exhibited high activity as catalysts in cellulose hydrolysis reactions and were clearly good catalysts that did not undergo deterioration in activity even in pressurized hot water.

(5) A Study of the Optimization and Reaction Mechanism of Ru/CMK-3 Catalyst

Accordingly, attention was focused on Ru/CMK-3. The effect on hydrolysis activity of the quantity of Ru supported was examined first. When the quantity of Ru supported was increased to 2, 5, and 10 wt %, the glucose yield increased from 26% to 32% (Table 2, Runs 2 to 4 (Embodiments 1 to 3)). Glucose selectivity also increased from 42% to 49%. When CMK-3 on which no metal was loaded was employed in a cellulose reaction, relatively high hydrolysis activity in the form of a cellulose conversion of 57%, a glucose yield of 19%, and glucose selectivity of 34% were exhibited (Run 22 (Embodiment 11)). When the reactor was changed, the glucose rate dropped, but when pressurized with $N_2$, a glucose yield equivalent to that in Run 22 was achieved. This was attributed to differences in the heating performance of the reactors (Runs 23 and 24 (Embodiments 12 and 13)). The combined yield of glucose and oligomers (dimers to tetramers) was about 40%, with little dependence on the quantity of Ru supported. Based on these results, despite the absence of sulfonic acid groups, CMK-3 was clearly able to hydrolyze cellulose. Further, the action of CMK-3 as a cellulose hydrolysis catalyst and the promotion of oligomer hydrolysis reactions by supported Ru were suggested. To demonstrate this, a cellobiose hydrolysis reaction was conducted at 120° C. As shown in Table 5, the CMK-3 exhibited low activity (glucose yield 7%, Run 39 (Reference Example 2)), but Ru/CMK-3 exhibited high activity (glucose yield 25%, Run 40 (Reference Example 3)). The Ru/CMK-3 catalyst clearly hydrolyzed oligomers and had high catalytic activity on glucose production. Similar results were obtained when CMK-3 was replaced with CMK-1.

TABLE 5

Hydrolysis reaction of cellobiose

| Run | Catalyst | Glucose yield (%, based on carbon) |
|---|---|---|
| 38 | None | 8.0 |
| 39 | CMK-3 | 7.0 |
| 40 | 5 wt % Ru/CMK-3 | 25 | a) Reaction conditions: cellobiose 342 mg (1 mmol), catalyst 50 mg, water 40 mL, 120° C., 24 h Next, the effect of the fine pores of CMK-3 was examined. First, MCM-41 was employed as a template and a carbon carrier was synthesized by the same method as with CMK-3. The carbon that was synthesized by this method was called C-MCM41. The same preparation was conducted using Q-10 (Fuji Silysia Cariact) as a template. The carbon synthesized by this method will be referred to as C-Q10 hereinafter. When these carbons were employed as catalysts, C-MCM41 exhibited a glucose yield of 10% (Run 26 (Embodiment 15)), and C-Q10 exhibited a glucose yield of 8% (Run 27 (Embodiment 16)). This was lower activity than that of CMK-3 (glucose yield 19%, Run 22 (Embodiment 11)), but the effect as a cellulose hydrolysis catalyst was sufficient and the activity was higher than that of activated carbon (Run 28 (Comparative Example 12)). Ru/C-MCM41 and Ru/C-Q10 were synthesized by the same method as Ru/CMK. Ru/C-MCM41 exhibited a glucose yield of 14% and Ru/C-Q10 exhibited a glucose yield of 18% (Runs 10 and 11 (Embodiments 9 and 10)).

TABLE 6

| Carbon | BET Specific surface area ($m^2/g$) | Pore volume ($cm^3/g$) | Pore diameter (nm) |
|---|---|---|---|
| CMK-3 | 1120 | 1.33 | 3.8 |
| C-MCM41 | 880 | 0.80 | — |
| C-Q10 | 840 | 1.67 | 8.1 |

Figure 3:
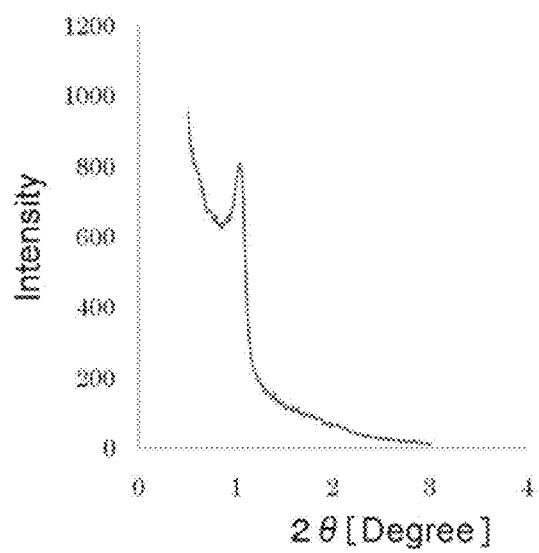
FIG. 3 Shows the SAXS pattern of the CMK-3 employed in the embodiments.

To gain information on the surface area and fine pores of the various carbon carriers, $N_2$ adsorption experiment was conducted. As shown in Table 6, the BET surface area of CMK-3 was 1,120 $m^2/g$, which was 1.4-fold the specific surface area of C-MCM41 and C-Q10. Calculation of the fine pore diameter distribution by the BJH method indicated that CMK-3 had uniform fine pores of 3.8 nm, and suggested that C-Q10 had mesopores of 8.1 nm. The fact that CMK-3 had regular fine pores was supported by the SAXS (small angle X-ray scattering, FIG. 3) pattern. In addition, C-MCM41 exhibited a broad fine pore distribution. As shown in Table 7, calculation of the glucose yield per unit surface area revealed CMK-3 $(0.34\%/m^2)$>C-MCM41 $(0.23\%/m^2)$>C-Q10 $(0.20\%/m^2)$. The catalytic activity per unit surface area of CMK-3 was also clearly high.

Next, FT-IR spectra were measured for the various carbon materials when diluted to 0.1 mass % with KBr (FIG. 4). Taking a straight line drawn from the minimum absorbance between 1,550 $cm^{-1}$ and 1,700 $cm^{-1}$ to the absorbance at 1,000 $cm^{-1}$ as a baseline, the difference between the baseline and the absorbance of the infrared absorption exhibited by phenolic hydroxyl groups at 1,240 $cm^{-1}$ was adopted as the absorption due to phenolic hydroxyl groups. The absorbance of phenolic hydroxyl groups was: CMK-3: 0.060; C-MCM41: 0.026; SX Ultra: 0.009; and C-Q10: 0.013. The absorbance due to aromatic rings at 1,530 $cm^{-1}$ as calculated using the same baseline was: CMK-3: 0.049; C-MCM41: 0.057; SX Ultra: 0.062; and C-Q10: 0.053. There were not large differences between the various carbons in terms of absorption due to aromatic rings, permitting its use as a reference value. Accordingly, the value of the absorbance of phenolic hydroxyl groups divided by the absorbance of aromatic rings, $(A_{PhOH}/A_C)$ was calculated for the various carbon materials as follows: CMK-3: 1.2, C-MCM41: 0.46; SX Ultra: 0.15; and C-Q10: 0.25. The order based on this value matched the order of the carbons based on glucose generation activity. The activity per unit surface area of CMK-3 is thought to be high because it contains a high degree of oxygen-containing functional groups and readily adsorbs cellulose and hydrolyzes the same. Absorption at 1,500 $cm^{-1}$ was assigned to the stretching vibration of aromatic rings, suggesting that all of the carbons had aromatic rings.

TABLE 7

Product yield relative to catalyst BET specific surface area

| | | Product yield ($10^{-2}\%/m^2$, based on carbon) | | | |
|---|---|---|---|---|---|
| Run | Catalyst | Tetramer or higher | Cellotriose | Cellobiose | Glucose | Mannose |
| 22 | CMK-3 | 7.3 | 12.5 | 16.8 | 33.9 | 2.3 |
| 2 | Ru/CMK-3 | 0 | 10.7 | 14.3 | 45.9 | 2.1 |
| 26 | C-MCM41 | 15.2 | 12.7 | 14.5 | 23.4 | 1.6 |
| 10 | Ru/C-MCM41 | 10.5 | 11.4 | 15.2 | 32.3 | 1.8 |
| 27 | C-Q10 | 16.0 | 11.0 | 12.1 | 19.5 | 1.7 |
| 11 | Ru/C-Q10 | 7.6 | 10.7 | 16.0 | 43.8 | 2.1 |

| | | Product yield ($10^{-2}\%/m^2$, based on carbon) | | | | Cellulose Conversion |
|---|---|---|---|---|---|---|---|
| Run | Catalyst | Fructose | Levoglucosan | 5-HMF[r) | Furfural | Total | ($10^{-2} \%/m^2$) |
| 22 | CMK-3 | 3.2 | 2.0 | 7.1 | 0.9 | 86.3 | 101 |
| 2 | Ru/CMK-3 | 3.2 | 2.7 | 5.0 | 0.9 | 84.3 | 110 |
| 26 | C-MCM41 | 2.3 | 1.1 | 5.7 | 0.7 | 77.3 | 108 |
| 10 | Ru/C-MCM41 | 2.5 | 1.8 | 4.3 | 0.7 | 80.5 | 117 |
| 27 | C-Q10 | 2.1 | 1.0 | 5.2 | 0.7 | 69.3 | 93.3 |
| 11 | Ru/C-Q10 | 3.1 | 2.6 | 6.0 | 1.0 | 92.9 | 126 |

The diffuse reflectance FT-IR spectra of the various carbon materials were measured (FIG. 5). The measurement was conducted as follows. A ceramic cup was filled with undiluted carbon. Modulated infrared light (an interferogram) was irradiated onto the carbon sample to cause diffuse reflectance. An integrating sphere was used to collect the light and guide it to an MCT detector. FIG. 5 shows the spectrum after Kubelka-Munk (K-M) function transformation of the measurement results. There is little significance to the absolute value of the K-M function and direct intensity comparison between spectra is impossible. Accordingly, the absorption intensity was normalized by the following method.

First, the absorption intensity due to phenolic hydroxyl groups was defined as follows. Taking the straight line drawn between the values of the K-M function at 1,190 $cm^{-1}$ and 1,270 $cm^{-1}$ as a baseline, the difference between the value of the K-M function at 1,240 $cm^{-1}$ and the baseline was adopted as the absorption intensity of phenolic hydroxyl groups.

Next, the absorption intensity due to aromatic rings was defined as follows. Taking the straight line drawn between the values of the K-M function at 1,540 $cm^{-1}$ and 1,750 $cm^{-1}$ as a baseline, the difference between the value of the K-M function at 1,615 $cm^{-1}$ and the baseline was adopted as the absorption intensity of aromatic rings.

Figure 6:
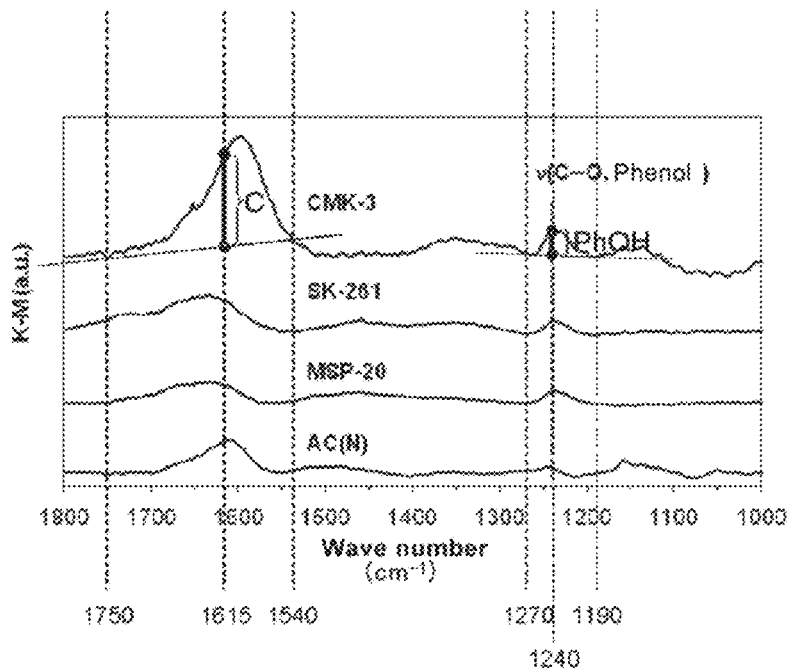
FIG. 6 Shows an example of the measurement of the aromatic ring absorption intensity C and the phenolic hydroxyl group absorption intensity PhOH for a baseline provided in the CMK-3 diffuse reflectance FT-IR spectrum in FIG. 5.

FIG. 6 shows an example of positioning the above baselines on the spectrum of CMK-3 shown in FIG. 5 and calculating the absorption intensity of phenolic hydroxyl groups PhOH and the absorption intensity C of aromatic rings.

The fact that the absorption intensity of aromatic rings per unit quantity of carbon was nearly constant for all of the carbon materials is as set forth above. Accordingly, the density of the phenolic hydroxyl groups on the carbon materials can be anticipated to be proportional to the value of the absorption intensity of phenolic hydroxyl groups divided by the absorption intensity of aromatic rings (defined as the ratio PhOH/C). That is, the normalized value of the PhOH/C ratio reflects the density of phenolic hydroxyl groups in the various carbon materials, and can be compared. The PhOH/C ratios of the various carbon materials were calculated as follows: CMK-3: 0.24, SK-261: 0.54, MSP-20: 0.78, and AC(N): 0.17. In SK-261 (in Table 8 and later, SDK-261) and MSP-20, which had high activity, phenolic hydroxyl groups are present at high density. In relatively active CMK-3 and low activity AC(N), the phenol hydroxyl group density drops. A good correlation was obtained. That is, all of the carbon materials exhibiting good activity had a PhOH/C ratio of 0.2 or greater.

Figure 7:
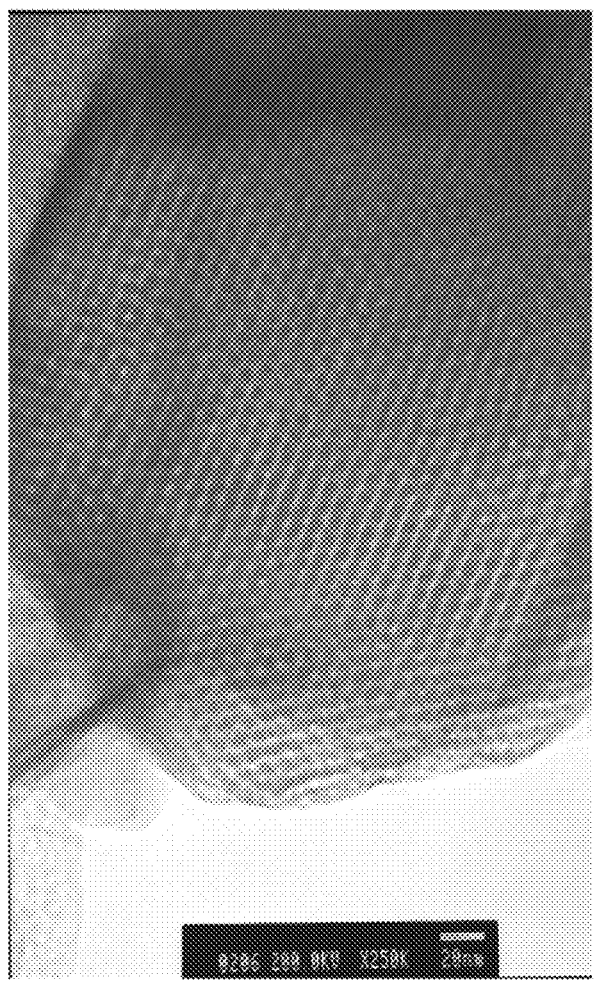
FIG. 7 Shows a TEM image of the Ru/CMK-3 employed in the embodiments.
Figure 8:
FIG. 8 Shows a flowchart for preparation of the catalyst using an impregnation method.

To gain information about supported Ru, Ru/CMK-3 catalyst was observed by TEM. That revealed a uniform fine pore structure in CMK-3, but the Ru particles could not be observed (FIG. 7). That suggested that since the Ru was present within the mesopores, it was highly dispersed without particle growth.

Based on the above results, the reaction mechanism of Ru/CMK-3 was presumed to be as follows. CMK-3 has a high specific surface area and a high density of oxygen-containing functional groups. It thus readily adsorbs cellulose, hydrolyzing it into oligomers. The oligomers enter the mesopores, and the highly dispersed supported Ru hydrolyzes the oligomers into glucose. Due to the concerted effects of CMK-3 and Ru, the Ru/CMK-3 catalyst is thought to exhibit high glucose production activity. However, this is not limited to the Ru/CMK-3 catalyst. The CMK-3 catalyst and other porous carbon materials and supported metal porous carbon materials also exhibit good cellulose hydrolysis performance and glucose production activity.

B. Evaluation of Catalysts Using Alkali-Activated Porous Carbon Materials Run 41 (Embodiment 23)

(1) Preparation of Catalyst

The method of preparing alkali-activated porous carbon materials is described. Coke was heat treated at 700° C. and finely milled in a jet mill. Potassium hydroxide was added and a heat treatment was conducted at 700° C. to activate the coke. The product was washed with water, neutralized with hydrochloric acid, boiled in hot water, and dried. This product was sieved to obtain a powder (SDK-261, average particle diameter 13 μm) with a particle diameter of 1 μm or greater and 30 μm or lower.

(2) Cellulose Hydrolysis Reaction

A reaction was conducted, using the alkali-activated porous carbon material obtained in (1) instead of the supported metal catalyst as a catalyst, according to the method described in A(2). The results are given in Table 8. As will be clear from Table 8, when the alkali-activated porous carbon material obtained in (1) was employed, a high cellulose conversion and glucose selectivity were obtained. Further, 5-hydroxymethylfurfural selectivity was low. With commercial activated carbon (SX Ultra made by Norit), used for comparison, a low cellulose conversion rate and glucose selectivity were achieved. This was equivalent to the case where no carbon material was added.

Run 42 (Embodiment 24)

A reaction was conducted using an alkali-activated porous carbon material obtained with a commercial phenol resin starting material (MSP-20, made by Kansai Coke and Chemicals Co., Ltd.) according to the method described in A(2). The results are given in Table 8. As is clear from Table 8, when the alkali-activated porous carbon material obtained from a commercial phenol resin starting material was employed, a higher cellulose conversion rate and glucose selectivity were obtained than in the comparative examples. Further, 5-hydroxymethylfurfuran selectivity was low.

TABLE 8

| Catalyst | | Cellulose Conversion | Glucose Selectivity | 5HMF Selectivity |
|---|---|---|---|---|
| Run 41 (Embodiment 23) | SDK-261 | 59% | 65% | 5% |
| Run 42 (Embodiment 24) | MSP-20 | 52% | 61% | 5% |
| Run 28 (Comparative example 12) | SX ultra | 32% | 18% | 4% |
| Run 1 (Comparative example 1) | None | 30% | 15% | 6% |

(3) Measurement of Functional Groups and Particle Diameter

The functional groups and average secondary particle diameters of the porous carbon materials employed in Run 41 (Embodiment 23), Run 42 (Embodiment 24), Run 28 (Comparative example 12), and Run 22 (Embodiment 11) were measured. The respective measurement methods were as follows.

Functional Croup Measurement Method

Carboxyl groups, lactone groups, and phenolic hydroxyl groups were quantified by the following methods using neutralization titration methods. First, $NaHCO_3$ was added to the porous carbon material, filtration was conducted, and the filtrate was reverse titrated with hydrochloric acid to quantify the carboxyl groups. Then, $Na_2CO_3$ was employed instead of NaHCO₃ in the same reverse titration to quantify the carboxyl groups and lactone groups. Next, NaOH was employed in the same reverse titration. Thus, the carboxyl groups, lactone groups, and phenolic hydroxyl groups were quantified. Based on this quantification analysis, the quantities of carboxyl groups, lactone groups, and phenolic hydroxyl groups were calculated.

To (1 g) of porous carbon material was added a 0.1 N (normal) NaHCO₃ aqueous solution (50 mL) and the mixture was shaken for 48 hours. The mixture was then filtered, and 10 mL of the filtrate was collected and introduced into 50 mL of water. Reverse titration was conducted with a 0.1 N (normal) HCl aqueous solution. The quantity of carboxyl groups was determined from the titer. Similarly, 0.1 N (normal) Na₂CO₃ aqueous solution (50 mL) was employed in a vibrated solution to determine the quantities of carboxyl groups+lactone groups. Similarly, a 0.1 N (normal) NaOH aqueous solution (50 mL) was used in a vibrated solution to determine the quantities of carboxyl groups+lactone groups+phenolic hydroxyl groups.

Method of Measuring Average Particle Diameter

A laser diffraction particle size distribution analyzer (Microtrac MT3300EXII made by Nikkiso) was employed to measure the average secondary particle diameter (d50 (based on volume)) (50% particle diameter) of the sample dispersed in water.

The results are shown in Table 9. As will be clear from Table 9, the porous carbon material of the present invention had a larger number of phenolic hydroxyl groups and a smaller average secondary particle diameter than the comparative examples. That was thought to contribute to the good effect achieved by the present invention.

TABLE 9

|  | Catalyst | Functional group quantity (mmol/kg) | | | BET Specific surface area (m²/g) | Average secondary particle diameter (d50(based on volume)) (μm) |
| --- | --- | --- | --- | --- | --- | --- |
|  |  | Carboxyl group | Lactone group | Phenolic hydroxyl group |  |  |
| Run 22 (Embodiment 11) | CMK-3 | 150 | <50 | 190 | 1120 | 8 |
| Run 41 (Embodiment 23) | SDK-261 | 180 | 210 | 460 | 2147 | 13 |
| Run 42 (Embodiment 24) | MSP-20 | <50 | 58 | 340 | 2330 | 8 |
| Run 28 (Comparative example 12) | SX ultra | 68 | <50 | 62 | 1200 | 36 |

Table 10 below shows the correspondence between Runs 1 to 42, Embodiments 1 to 24, Comparative Examples 1 to 15, and Reference Examples 1 to 3 in organized fashion.

TABLE 10

| Embodiment | Run |
| --- | --- |
| 1 | 2 |
| 2 | 3 |
| 3 | 4 |
| 4 | 5 |
| 5 | 6 |
| 6 | 7 |
| 7 | 8 |
| 8 | 9 |
| 9 | 10 |
| 10 | 11 |
| 11 | 22 |
| 12 | 23 |
| 13 | 24 |
| 14 | 25 |
| 15 | 26 |
| 16 | 27 |
| 17 | 29 |
| 18 | 30 |
| 19 | 31 |
| 20 | 35 |
| 21 | 36 |
| 22 | 37 |
| 23 | 41 |
| 24 | 42 |

TABLE 10-continued

| Comparative example | Run |
| --- | --- |
| 1 | 1 |
| 2 | 12 |
| 3 | 13 |
| 4 | 14 |
| 5 | 15 |
| 6 | 16 |
| 7 | 17 |
| 8 | 18 |
| 9 | 19 |
| 10 | 20 |
| 11 | 21 |
| 12 | 28 |
| 13 | 32 |
| 14 | 33 |
| 15 | 34 |

TABLE 10-continued

| Reference example | Run |
| --- | --- |
| 1 | 38 |
| 2 | 39 |
| 3 | 40 |

INDUSTRIAL APPLICABILITY

The present invention is useful in the field of techniques of manufacturing solutions containing sugars such as glucose from cellulose starting materials.

The invention claimed is:

1. A catalyst for hydrolyzing cellulose or hemicellulose, in which a Group 8 to 11 transition metal is supported on a porous carbon material comprising a quantity of phenolic hydroxyl groups of 100 mmol/kg or greater and 700 mmol/kg or lower and having a specific surface area of 800 $m^2$/g or higher and 2,500 $m^2$/g or lower.

2. The catalyst according to claim 1, wherein the porous carbon material is a porous carbon material having a form in which mesoporous silica is served as a template and fine pores of the mesoporous silica are filled with carbon.

3. The catalyst according to claim 1, wherein in the porous carbon material, when a straight line drawn from the minimum absorbance value between 1,550 $cm^{-1}$ and 1,700 $cm^{-1}$ to the absorbance at 1,000 $cm^{-1}$ in the FT-IR transmission spectrum of carbon is employed as a baseline, the ratio of the absorbance at 1,240 $cm^{-1}$ due to phenolic hydroxyl groups to the absorbance at 1,530 $cm^{-1}$ due to aromatic rings ($A_{PhOH}$/Ac) is 0.2 or greater.

4. The catalyst according to claim 1, wherein the average secondary particle diameter (d50 (based on volume)) of the porous carbon material is 1 μm or greater and 30 μm or lower.

5. The catalyst according to claim 1, wherein the transition metal is at least one member selected from the group consisting of ruthenium, platinum, rhodium, palladium, iridium, nickel, cobalt, iron, copper, silver, and gold.

6. The catalyst according to claim 1, wherein the transition metal is at least one member selected from the group consisting of ruthenium, platinum, palladium, and rhodium.

7. The catalyst according to claim 1, wherein cellulose is heated in the presence of water to produce oligosaccharides and glucose.

8. The catalyst according to claim 1, wherein hemicellulose is heated in the presence of water to produce sugar.

9. A method for producing a sugar-containing solution comprised mainly of sugars, comprising hydrolyzing hemicellulose in the presence of at least the catalyst according to claim 1 and water to produce at least an oligosaccharide or monosaccharide.

10. A catalyst for hydrolyzing cellulose or hemicellulose, comprised of a porous carbon material comprising a quantity of phenolic hydroxyl groups of 100 mmol/kg or greater and 700 mmol/kg or lower and having a specific surface area of 800 $m^2$/g or higher and 2,500 $m^2$/g or lower.

11. The catalyst according to claim 10, wherein the porous carbon material has a form in which mesoporous silica is served as a template and fine pores of the mesoporous silica are filled with carbon.

12. The catalyst according to claim 10, wherein in the porous carbon material the ratio (PhOH/C) of the absorption intensity, based on phenolic hydroxyl groups at 1,240 $cm^{-1}$ adopting a straight line connecting the values of the K-M function at 1,190 $cm^{-1}$ and 1,270 $cm^{-1}$ as baseline, to the absorption intensity, based on aromatic rings at 1,615 $cm^{-1}$ adopting a straight line connecting the K-M function values at 1,540 $cm^{-1}$ and 1,750 $cm^{-1}$ as baseline in the diffuse reflectance FT-IR spectrum after the Kubelka-Munk (K-M) function transformation of carbon, is 0.2 or greater.

13. The catalyst according to claim 10, wherein the average secondary particle diameter (d50 (based on volume)) of the porous carbon material is 1 μm or greater and 30 μm or lower.

14. A method for producing a sugar-containing solution comprised mainly of glucose, comprising hydrolyzing cellulose in the presence of water and the catalysts according to claim 1 to produce at least oligosaccharides and glucose.

15. The production method according to claim 14, wherein the hydrolysis of cellulose is conducted at a temperature producing a pressurized state.

16. The production method according to claim 15, wherein the heating temperature falls within a range of 110 to 380° C.

17. The production method according to claim 14, wherein the heating is ended at a point in time when the conversion of cellulose by hydrolysis is between 10 and 100% and the glucose selectivity is between 20 and 80%.

18. The production method according to claim 15, wherein the heating is ended at a point in time when the conversion of cellulose by hydrolysis is between 10 and 100%, the glucose selectivity is between 20 and 80%, and the 5-hydroxymethylfurfural selectivity is 8% or less.

19. The production method according to claim 15, wherein the reaction solution is cooled after ending the heating.

20. The production method according to claim 19, wherein the cooling of the reaction solution is conducted under conditions that maintain a glucose selectivity of between 20 and 80%.

21. The production method according to claim 19, wherein the cooling of the reaction solution is conducted at a rate of from 1 to 200° C./minute to a temperature of 110° C.

22. The production method according to claim 14, wherein the cellulose has crystallinity, or is cellulose of reduced crystallinity.

23. The production method according to claim 14, wherein following hydrolysis, the reaction mixture is subjected to solid-liquid separation to separate a sugar-containing solution comprised mainly of glucose and a solid containing at least the catalyst and unreacted cellulose.

* * * * *